United States Patent
Mano

(10) Patent No.: US 6,598,160 B1
(45) Date of Patent: Jul. 22, 2003

(54) IPL SYSTEM APPLIED TO A MULTIPROCESSOR SYSTEM

(75) Inventor: Kosei Mano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 09/607,127

(22) Filed: Jun. 29, 2000

(30) Foreign Application Priority Data

Jul. 15, 1999 (JP) .......................................... 11-201308

(51) Int. Cl.⁷ .......................... G06F 15/177; G06F 9/24
(52) U.S. Cl. ......................................... 713/2; 709/222
(58) Field of Search .................... 713/1, 2; 709/105, 709/106, 220, 222

(56) References Cited

U.S. PATENT DOCUMENTS

| | | | | |
|---|---|---|---|---|
| 5,564,040 A | * | 10/1996 | Kubala | 711/173 |
| 5,590,285 A | * | 12/1996 | Krause et al. | 709/218 |
| 6,453,344 B1 | * | 9/2002 | Ellsworth et al. | 709/220 |
| 6,466,972 B1 | * | 10/2002 | Paul et al. | 709/222 |
| 2002/0016891 A1 | * | 2/2002 | Noel et al. | 711/153 |

FOREIGN PATENT DOCUMENTS

| | | |
|---|---|---|
| JP | 61-163460 | 7/1986 |
| JP | 63-200263 | 8/1988 |
| JP | 6-342377 | 12/1994 |

OTHER PUBLICATIONS

Ser. No. 09/361,971 filed Jul. 28, 1999—Distributed Processing System, Distributed Processing Method, Computer–Readable Recording Medium With a Program for Making a Computer Execute the Method, Server and Client Service.

* cited by examiner

*Primary Examiner*—Dennis M. Butler
(74) *Attorney, Agent, or Firm*—Katten Muchin Zavis Rosenman

(57) ABSTRACT

An IPL system according to the present invention includes a file server, a dividing unit and a decision unit. The file server stores system data consisting of programs and data. The dividing unit is operatively connected to the file server, divides the system data into functional units, and prepares functional processors each structured by gathering the functional units. The decision unit is operatively connected to the file server and determines the functional processors to be transferred to each of the plurality of processors, in accordance with contents of operation data which are different from each other in each of the plurality of processors. According to the present invention, it is possible to realize an effective IPL of the processor by selectively using functional processors consisting of system data functional processors and operation data functional processors, in accordance with the different functions in each processor.

12 Claims, 25 Drawing Sheets

Fig.4

| FPR ID NUMBER | NAMES AND CONTENTS OF FPR |
|---|---|
| 0 | GLP: SYSTEM DATA RELATED TO FUNCTIONS INSTALLED IN COMMON TO ALL PROCESSORs (example, OPERATING SYSTEM) |
| 1 | OMP: SYSTEM DATA RELATED TO OPERATION/MAINTENANCE FUNCTIONs |
| 2 | CLP: SYSTEM DATA RELATED TO CALL FUNCTIONs (SWITCHING SERVICE) |
| 3 | SGP: SYSTEM DATA RELATED TO SIGNAL PROCESSING FUNCTIONS (example, SS7) BETWEEN EXTERNAL SYSTEMs |
| 4 | AMP: SYSTEM DATA RELATED TO CHARGING PROCESSING FUNCTIONS |

GLP (GLOBAL FPR)
OMP (OPERATION/MAINTENANCE FPR)
CLP (CALL PROCESSING FPR)
SGP (SIGNAL PROCESSING FPR)
AMP (AUTOMATIC ACCOUNTING FPR)

Fig.5

| NAME OF MODULE | NAME OF FPR | HEAD VIRTUAL ADDRESS |
|---|---|---|
| MODULE 01 | GLP | aaaaaaa |
| MODULE 02 | GLP | bbbbbbb |
| MODULE 03 | CLP | ccccccc |
| MODULE 04 | SGP | ddddddd |
| ... | ... | ... |
| MODULE nn | AMP | eeeeeee |

Fig.6

| MO-BOOT | DK-BOOT | SYS MOD | SYS FPR1 | ... | SYS FPRn | OPD FPR1 | ... | OPD FPRn | OPD PRO1 | ... | OPD PROm |

MO-BOOT: BOOT FOR EXECUTING IPL FROM MO APPARATUS
DK-BOOT: BOOT FOR EXECUTING IPL FROM FILE SERVER
SYS MOD: SYSD STRUCTURAL MODULE REGISTRATION TABLE
SYS FPRi: SYSD FPR CORRESPONDING TO FPR i
OPD FPRi: OPD FPR CORRESPONDING TO FPR i (VACANT DATA)
OPR PROj: OPD FPR CORRESPONDING TO (PHYSICAL) PROCESSOR j
        (VACANT DATA)

DATA STRUCTURE OF EACH FILE

Fig.9

| FPR ID NUMBER | NAMES AND CONTENTS OF FPR |
|---|---|
| 0 | GLP: OPERATION DATA RELATED TO FUNCTIONs INSTALLED IN COMMON TO ALL PROCESSORs |
| 1 | OMP: OPERATION DATA RELATED TO OPERATION/MAINTENANCE FUNCTIONs |
| 2 | CLP: OPERATION DATA RELATED TO CALL FUNCTIONs (SWITCHING SERVICE) |
| 3 | SGP: OPERATION DATA RELATED TO SIGNAL PROCESSING FUNCTIONs (example, SS7) BETWEEN EXTERNAL SYSTEMs |
| 4 | AMP: OPERATION DATA RELATED TO CHARGING PROCESSING FUNCTIONs |
| 31 | LCP: OPERATION DATA DIFFERENT IN EACH PROCESSOR |

LCP (LOCAL FUNCTIONAL PROCESSOR)

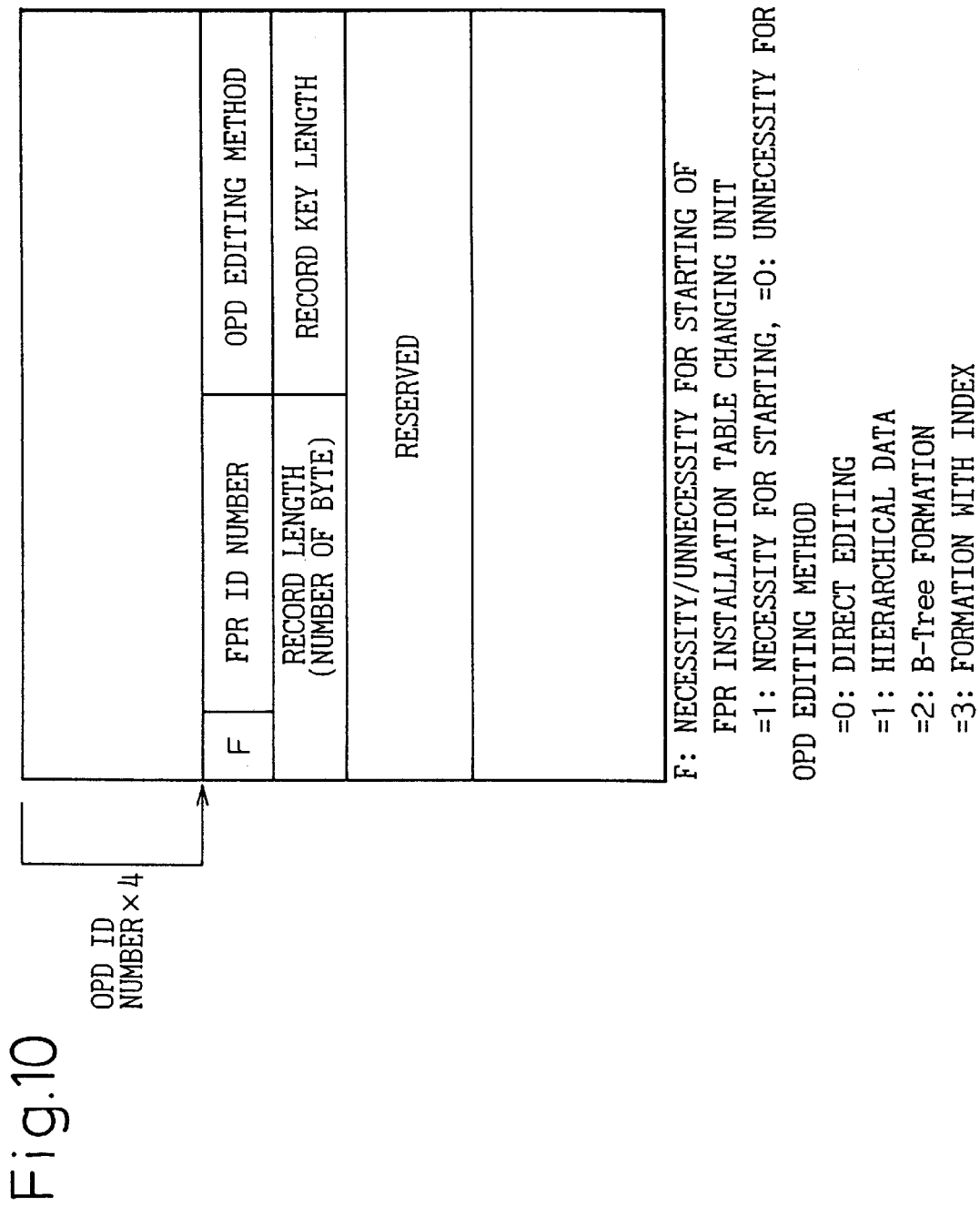

Fig.13

| FUNCTION PROCESSOR | OPERATION DATA FOR DECIDING INSTALLATION OF FPR |
|---|---|
| GLP | NOTHING (INSTALLED TO ALL PROCESSORS WITHOUT CONDITION) |
| OMP | DECIDING BY INSTALLATION OF WORK STATION |
| CLP | INSTALLATION OF NETWORK INPUT/OUTPUT APPARATUS, AND INSTALLATION OF HIGHWAY INFORMATION TO BE PROCESSED BY A PROCESSOR |
| SGP | INSTALLATION OF SIGNAL PROCESSING APPARATUS |
| AMP | INSTALLATION OF DISK APPARATUS FOR STORING CHARGING DATA |
| LCP | INSTALLED AT INSTALLATION OF PROCESSOR |

PROCESSOR NUMBER

F=0: PROCESSOR UNINSTALLED
 =1: PROCESSOR INSTALLED

Fig.15

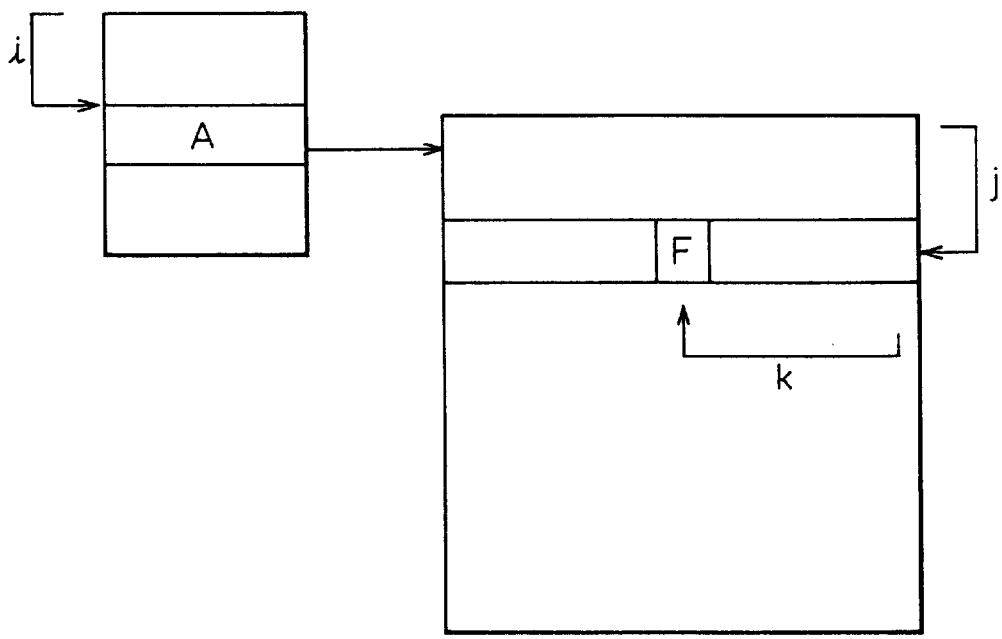

i: PROCESSOR NUMBER
j: IDENTIFICATION NUMBER OF APPARATUS
   PROCESSOR CPU=0
   PROCESSOR MEMORY=1
   PROCESSOR COMMUNICATION BUS=2
   INTERFACE FILE SERVER=3
   MO=4
   WS=5
   NETWORK HIGHWAY=6
   SIGNAL PROCESSOR=7
   CHARGING DISK=8
   CHARGING CENTER INTERFACE=9
k: APPARATUS NUMBER
A: NEXT TABLE LINK, "0" (WHEN PROCESSOR IS NOT INSTALLED)
F: INSTALLATION STATE OF APPARATUS,
   =1 (INSTALLED), =0 (UNINSTALLED)

i: PROCESSOR NUMBER-1 (0~31)
j: FPR ID NUMBER (0~31)
f: 0=UNINSTALLED, 1=INSTALLED
g: 0=UNINSTALLED, 1=INSTALLED

| FPR 1 SYSD |
| FPR 1 OPD |
| FPR 2 SYSD |
| FPR 2 OPD |
| |
| FPR n SYSD |
| FPR n OPD |
| FPR 31 OPD |

Fig.18

| PROCESSOR 1 | PROCESSOR 2, 3 | PROCESSOR 4 |
|---|---|---|
| FPR 0 SYSD | FPR 0 SYSD | FPR 0 SYSD |
| FPR 0 OPD | FPR 0 OPD | FPR 0 OPD |
| FPR 1 SYSD | FPR 2 SYSD | FPR 3 SYSD |
| FPR 1 OPD | FPR 2 OPD | FPR 3 OPD |
| VACANT | VACANT | FPR 31 OPD |
| FPR 31 OPD | VACANT | |
| | FPR 31 OPD | |

Fig.19

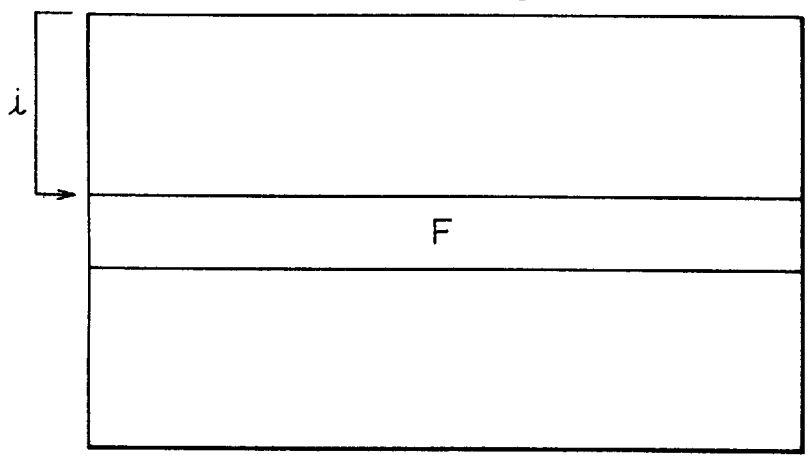

i: MEMORY BLOCK NUMBER (1 M byte unit)
F: ALLOCATING STATE OF FPR IN MEMORY OF 1 M byte unit

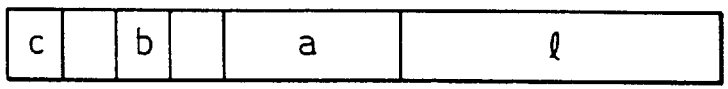

a: FPR IDENTIFICATION (8 bits)
b: WHETHER SYSD OR OPD (1 bit)
   =0 (SYSD), =1 (OPD)
c: REAL MEMORY INSTALLED/UNINSTALLED (1 bit)
   =0 (UNINSTALLED), =1 (INSTALLED)
$\ell$: NEXT MEMORY BLOCK NUMBER FOR LOADING
   SAME FPR FILE (16 bits)
   START BLOCK (C=1, and 1=0)

PROCESSOR INSTALLATION TABLE

| 0 | ~ | 0 1 1 1 1 1 |

PROCESSOR NUMBER-1

F=0: UNINSTALLED
=1: INSTALLED

Fig.21A

FPR INSTALLATION TABLE

| 0 0 0 0 0 0 0 0 0 0 0 0 0 0 0 0 0 0 0 0 0 0 0 0 0 0 0 0 0 0 1 1 |
|---|
| 1 0 0 0 0 0 0 0 0 0 0 0 0 0 0 0 0 0 0 0 0 0 0 0 0 0 0 0 0 0 1 1 |
| 0 0 0 0 0 0 0 0 0 0 0 0 0 0 0 0 0 0 0 0 0 0 0 0 0 0 0 0 0 1 0 1 |
| 1 0 0 0 0 0 0 0 0 0 0 0 0 0 0 0 0 0 0 0 0 0 0 0 0 0 0 0 0 1 0 1 |
| 0 0 0 0 0 0 0 0 0 0 0 0 0 0 0 0 0 0 0 0 0 0 0 0 0 0 0 0 0 1 0 1 |
| 1 0 0 0 0 0 0 0 0 0 0 0 0 0 0 0 0 0 0 0 0 0 0 0 0 0 0 0 0 1 0 1 |
| 0 0 0 0 0 0 0 0 0 0 0 0 0 0 0 0 0 0 0 0 0 0 0 0 0 0 0 0 1 0 0 1 |
| 1 0 0 0 0 0 0 0 0 0 0 0 0 0 0 0 0 0 0 0 0 0 0 0 0 0 0 0 1 0 0 1 |
| 0 0 0 0 0 0 0 0 0 0 0 0 0 0 0 0 0 0 0 0 0 0 0 0 0 0 0 1 0 0 0 1 |
| 1 0 0 0 0 0 0 0 0 0 0 0 0 0 0 0 0 0 0 0 0 0 0 0 0 0 0 1 0 0 0 1 |

PROCESSOR 1 (rows 1-2)
PROCESSOR 2 (rows 3-4)
PROCESSOR 3 (rows 5-6)
PROCESSOR 4 (rows 7-8)
PROCESSOR 5 (rows 9-10)

Fig.21B

FPR INSTALLATION TABLE

| FPR 0 SYSD |
|---|
| FPR 0 OPD |
| FPR 2 SYSD |
| FPR 2 OPD |
| VACANT |
| VACANT |
| FPR 31 OPD |

PROCESSOR INSTALLATION TABLE

| 0 | ~ | 0 1 1 1 1 1 |

PROCESSOR NUMBER-1

F=0: UNINSTALLED
 =1: INSTALLED

Fig.23A

FPR INSTALLATION TABLE

| | |
|---|---|
| 0000000000000000000000000000011 | PROCESSOR 1 |
| 1000000000000000000000000000011 | |
| 0000000000000000000000000000101 | PROCESSOR 2 |
| 1000000000000000000000000000101 | |
| 0000000000000000000000000001101 | PROCESSOR 3 |
| 1000000000000000000000000001101 | |
| 0000000000000000000000000001001 | PROCESSOR 4 |
| 1000000000000000000000000001001 | |
| 0000000000000000000000000010001 | PROCESSOR 5 |
| 1000000000000000000000000010001 | |

Fig.23B

| |
|---|
| FPR 0 SYSD |
| FPR 0 OPD |
| FPR 2 SYSD |
| FPR 2 OPD |
| FPR 3 SYSD |
| FPR 3 OPD |
| FPR 31 OPD |

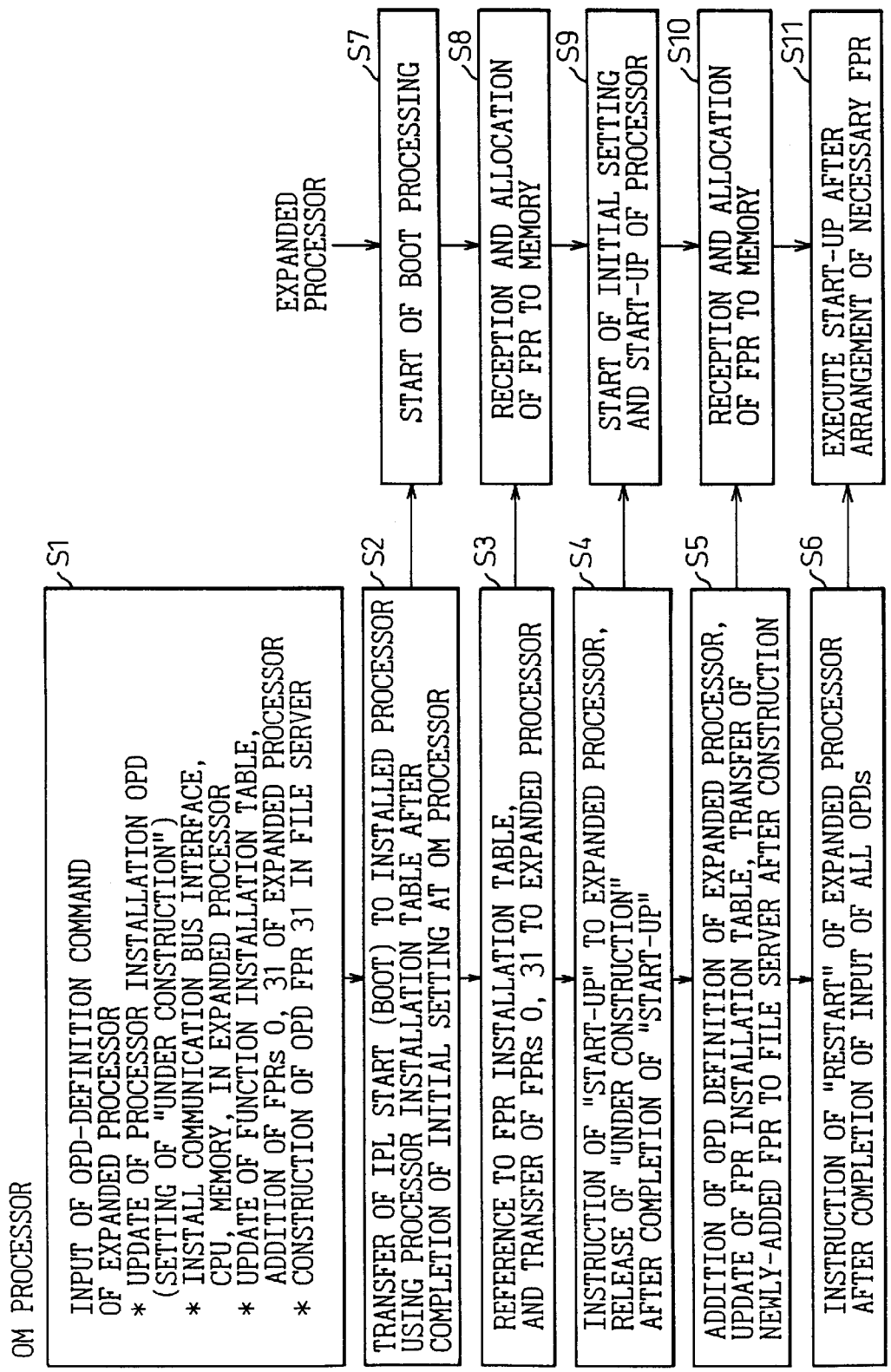

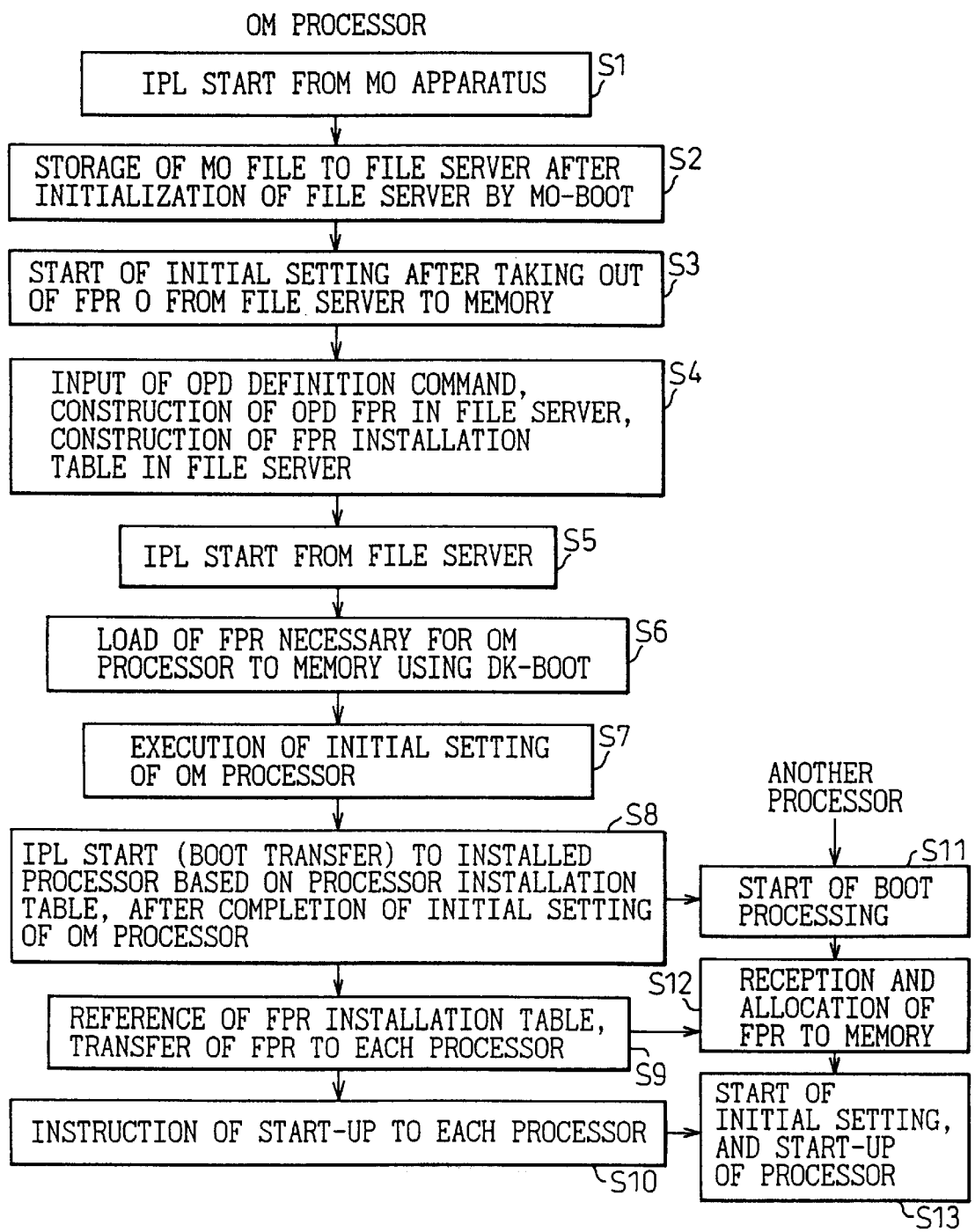

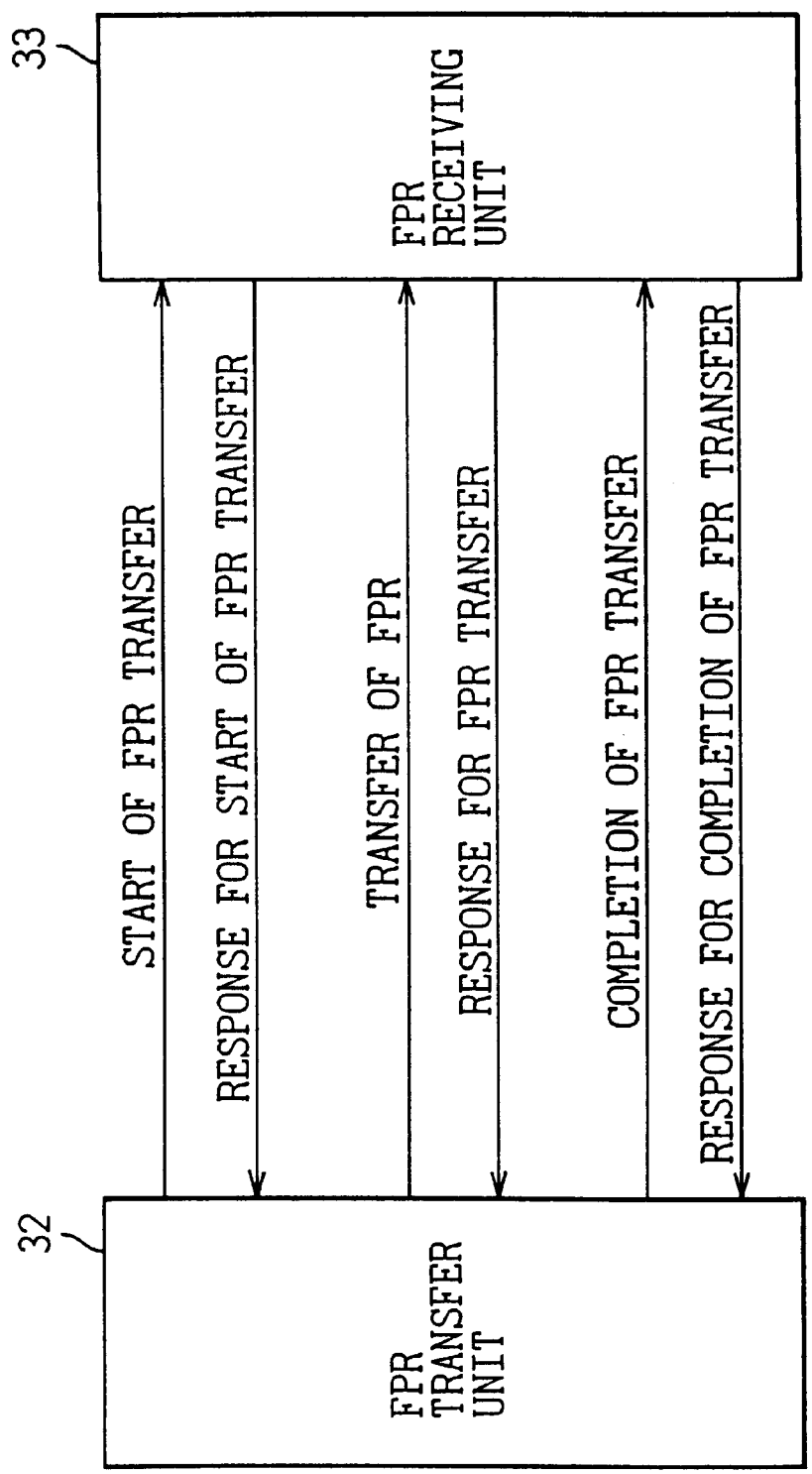

Fig.27

| NAME OF PATCH FILE |
| --- |
| MODULE FILE ID TO BE PATCHED |
| VIRTUAL ADDRESS TO BE PATCHED |
| NUMBER OF WORD TO BE PATCHED |
| CONTENTS OF PATCH |
| OLD CONTENTS OF PATCHED AREA |
| EXPLANATIONS OF CONTENTS AT PATCH OPERATION |

IPL SYSTEM APPLIED TO A MULTIPROCESSOR SYSTEM

BACKGROUND OF THE INVENTION

1. Field of the Invention

The present invention relates to an IPL (Initial Program Load) system applied to a multiprocessor system.

2. Description of the Related Art

In conventional IPL systems, the same program is installed in all processors which constitute a multiprocessor system. In this method, however, when new function is added to the multiprocessor system, memory capacity must be increased in order to install a new program for the new function so that the cost of the hardware also rises.

Further, when changing a program installed in each processor, an arrangement for each customer and system must be managed manually so that there is an increase in the working time to manage each customer and system. Further, mistakes occur due to the increased working time.

On the other hand, there is another method able to solve the above problem. That is, there is a method in which the program installed in each processor is determined based on a fixed pattern. In this method, however, a partial work charged to each processor, each having different function, must be fixed, and it is necessary to reconsider change of installed pattern when expanding functions.

Further, there is another method for providing virtual storage, including all processors which constitute the multiprocessor system, and for executing on-demand paging of the virtual storage. For example, as explanation of on-demand paging, it is assumed that there is a structure constituted by a disk apparatus, a main memory connected to the disk apparatus and a terminal connected to both memory and disk apparatus. In this case, a certain program is installed in a disk apparatus. When a certain command is input from a terminal, the main memory detects the command, starts the program corresponding to the command, and takes the program from the disk apparatus in order to allocate memory to the program.

In the above on-demand paging, however, a very large overhead occurs during transfer and execution of the program so that it is inappropriate for executing real time processing.

Accordingly, the present invention aims to resolve the above-mentioned conventional problems. That is, according to the present invention, it is possible to achieve an IPL system by automatically selecting programs, which are required to realize functions provided in each processor, by combining selected programs with each other in order to effectively use the memory which installs the program, and by reducing the time for IPL processing in each processor. Further, it is possible to achieve the IPL system by automatically executing re-arrangement of the program in accordance with change of charge for each processor, by reducing manual works at re-arrangement of the program, and by effectively realizing real time processing by allocating the program in a real memory.

SUMMARY OF THE INVENTION

The object of the present invention is to provide an IPL system which can realize an effective IPL process of the processor by selectively using functional processors consisting of system data functional processors and operation data functional processors, in accordance with different functions in each processor.

In accordance with the present invention, there is provided an IPL system applied to a multiprocessor system including a plurality of processors, comprising; a file server for storing system data consisting of programs and data; a dividing unit operatively connected to the file server for dividing the system data into functional units, and for preparing functional processors each structured by gathering the functional units; and a decision unit operatively connected to the file server for determining the functional processors to be transferred to each of the plurality of processors, in accordance with the contents of operation data which are different from each other in each of the plurality of processors.

In a preferred embodiment, the functional processors comprises system data functional processors and operation data functional processors.

In another preferred embodiment, the system data functional processors comprise five kinds of functional processors, i.e., system data related to functions installed in common to all processors, system data related to operation/maintenance functions, system data related to call functions, system data related to signal processing functions between external systems, and system data related to charging processing functions.

In still another preferred embodiment, the operation data functional processors comprise six kinds of functional processors, i.e., operation data related to functions installed in common to all processors, operation data related to operation/maintenance functions, operation data related to call functions, operation data related to signal processing functions between external systems, operation data related to charging processing functions, and operation data different from in each processor.

In still another preferred embodiment, after the system data functional processors and the operation data functional processors are constructed in the file server, an IPL process of each of the processors is activated.

In still another preferred embodiment, when the operation data is changed during operation of the system; change of installation of the functional processor is automatically determined to each processor based on the contents of change; the functional processor to be newly installed is automatically transferred to the corresponding processor; and memory allocation in the corresponding processor is released for the processor to be newly uninstalled.

In still another preferred embodiment, when the operation data is changed during operation of the system; the processor for installing functional processors including changed operation data is detected; and the same changed contents are reflected onto the corresponding functional processor of each processor.

In still another preferred embodiment, when a patch is input to the functional processor; installation of the functional processor to each processor is determined; and the patch is automatically executed to all corresponding functional processors of each processor.

In still another preferred embodiment, whether the contents of the same functional processor installed in each processor are different is periodically verified; and when there is an inconsistency, the inconsistency is revised based on the contents of the file server.

In still another preferred embodiment, the file server comprises a module registration table consisting of module names, functional processor names each corresponding to the module name, and head virtual addresses each corresponding to the functional processor name; a system data functional processor including a plurality of functional processors each corresponding to system data; an operation data functional processor including a plurality of functional processors each corresponding to operation data; and a functional processor installation table including processor numbers, kinds of processors, data of installed/uninstalled state of each functional processor.

In still another preferred embodiment, the dividing unit comprises means for editing system data functional processors, and means for generating and changing operation data functional processors.

In still another preferred embodiment, the decision unit comprises means for changing a functional processor installation table; means for executing an IPL process for each processor and performing start-up of the system; means for transferring functional processors to designated processor; means for receiving functional processors; means for allocating functional processors to memory; means for changing functional processors based on change of system data; and means for verifying functional processors with the contents of file server.

BRIEF DESCRIPTION OF THE DRAWINGS

FIG. 4 shows a sort of functional processor of system data;

FIG. 5 is a view for explaining the contents of a module registration table;

FIG. 6 shows a file structure after processing in a SYSD FPR editing unit;

FIG. 9 shows a kind of functional processor of operation data;

FIG. 10 shows a structure of an OPD (operation data) attribute table;

FIGS. 13 to 15 show operation data for determining the installation/non-installation of the functional processor at the system structure of FIG. 3 and the functional processor of FIG. 9;

FIG. 18 shows one example of allocation of FPR on a real memory;

FIG. 19 shows one example of an FPR memory allocating table;

FIG. 21A shows one example of functional processor (FPR) installation table;

FIG. 21B shows one example of allocating state of real memory;

FIG. 23A shows one example of functional processor (FPR) installation table;

FIG. 23B shows one example of allocating state of real memory;

FIGS. 22A to 23B show example of information after expansion of apparatus;

FIG. 24 is flowchart for executing expansion of processor;

FIG. 25 shows basic steps of the system IPL process;

FIG. 26 is a view for explaining interface between the FPR transfer unit and the FPR receiving unit shown in FIG. 2; and FIG. 27 shows one example of a patch file.

DESCRIPTION OF THE PREFERRED EMBODIMENTS

Figure 1:
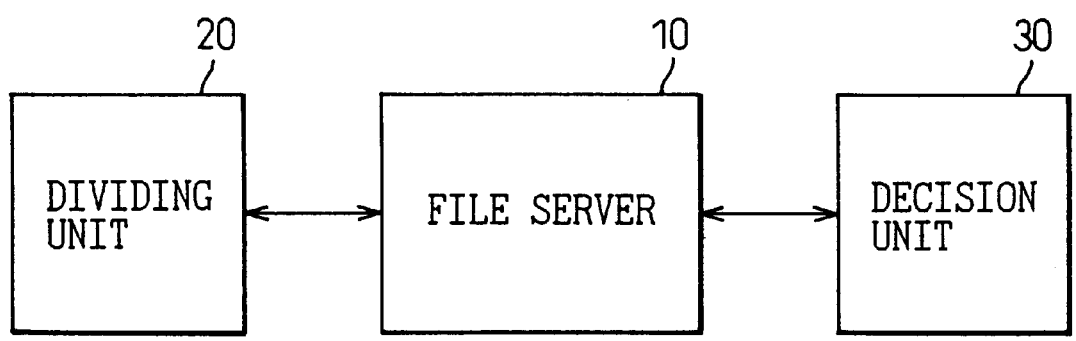
FIG. 1 is a basic block diagram of an IPL system applied to a multiprocessor according to the present invention.

FIG. 1 is a basic block diagram of an IPL system applied to a multiprocessor according to the present invention. In FIG. 1, reference number 10 denotes a file server structured by a multiprocessor system, and stores programs and data used in the system. Reference number 20 denotes a dividing unit for preparing functional processors each of which is structured by a gathering of each function provided when programs and data (which are operated in the system) are divided into functional units in accordance with function. Reference number 30 denotes a decision unit-for determining a functional processor to be transferred to a memory of each processor in accordance with the contents of data which are different in each system, corresponding to functions, such as installing information of the hardware.

In the following explanations, the functional processor (simplified as FPR) means the gathering of functional units provided when programs and data (which are operated in the system, i.e., system data) are divided into functional units in accordance with each function. Further, the system data (simplified as SYSD) means programs operated in the system and data attached to the programs which are not changed even if the system is changed. Still further, the operation data (simplified as OPD) means data which are different from each system corresponding to functions, such as installing information for the hardware.

Figure 2:
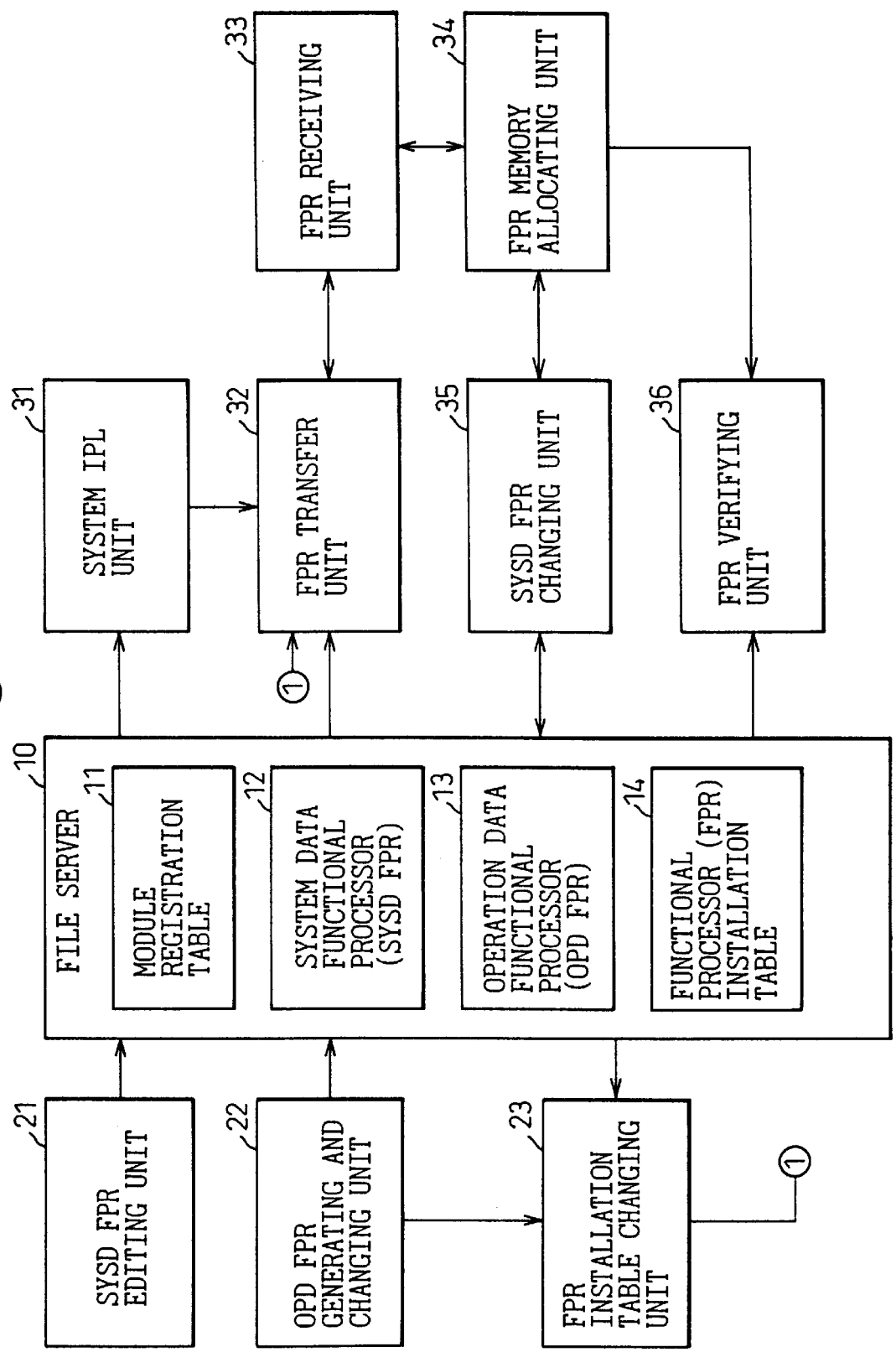
FIG. 2 is a block diagram of an IPL system according to an embodiment of the present invention.

FIG. 2 is a block diagram of an IPL system according to an embodiment of the present invention. The file server 10 includes a module registration table 11, a system data functional processor (SYSD FPR) 12, an operation data functional processor (OPD FPR) 13, and a functional processor installation table 14.

Further, reference number 21 denotes a system data functional processor editing unit (below, an SYSD FPR editing unit), reference number 22 denotes an operation data functional processor generating and changing unit (below, an OPD FPR generating and changing unit), and reference number 23 denotes a functional processor installation table changing unit (below, an FPR installation table changing unit). These units 21 to 23 are connected to the file server 10.

The SYSD FPR editing unit 21 divides modules which constitute programs and data in accordance with functions, gathers these functions, and edits gathered functions as the file of the SYSD FPR 12. The FPR editing unit 21 is operated in an off-line mode.

The OPD FPR generating and changing unit 22 is activated by a command which prepares the operation data and updates them, and divides each operation data for every functional processor. Further, the OPD FPR generating and changing unit 22 detects the functional processor in which such operation data are stored when generating and changing the operation data, and changes the operation data installed in each processor.

The FPR installation table changing unit 23 determines the functional processor to be installed to each processor from the input operation data, and records them into the FPR installation table 14. Further, the FPR installation table changing unit 23 transfers a newly-installed FPR to the corresponding processor, and removes a newly-uninstalled FPR from the corresponding processor.

Reference number 31 denotes a system IPL unit connected to the file server 10. Reference number 32 denotes a functional processor transfer unit (below, an FPR transfer unit) connected to the file server 10 and the FPR installation table changing unit 23. Reference number 33 denotes a functional processor receiving unit (below, an FPR receiving unit) connected to the FPR transfer unit 32. Reference number 34 denotes a functional processor memory allocating unit (below, an FPR memory allocating unit) connected to the FPR receiving unit 33. Reference number 35 denotes a system data functional processor changing unit (below, an SYSD FPR changing unit) connected to the file server 10 and the FPR memory allocating unit 34. Reference number 36 denotes a functional processor verifying unit (below, an FPR verifying unit) connected to the file server 10 and the FPR memory allocating unit 34.

The system IPL unit 31 determines the functional processor which is installed in each processor, and executes start-up of the system by executing the IPL for the functional processor in each processor using the FPR transfer unit 32, the FPR receiving unit 33 and the FPR memory allocating unit 34. The SYSD FPR 12 reads the file which is generated by the SYSD FPR editing unit 21 into the file server 10. The OPD FPR 13 is automatically prepared in the system based on input of an operation data definition command.

The FPR transfer unit 32 reads a file of a designated functional processor from the file server 10, and transfers the file to a designated processor. Further, the FPR transfer unit 32 erases the designated functional processor from the designated processor.

The FPR receiving unit 33 receives the functional processor which is transferred from the FPR transfer unit 32, and allocates the functional processor on the real memory in accordance with the FPR memory allocating unit 34. Further, when erasing the functional processor from the processor, the FPR receiving unit 33 erases the functional processor designated by the FPR transfer unit 32 from the real memory.

The FPR memory allocating unit 34 manages the allocating state of each functional processor on the real memory of each processor, and executes memory allocation. The SYSD FPR changing unit 35 detects the functional processor containing a portion to be changed when the portion to be changed on the system data in input, and changes the corresponding portion of the functional processor which is installed in each processor.

The FPR verifying unit 36 periodically verifies the contents of the file server 10 so as not to be contrary to each other on the contents of the same functional processor installed in each processor, and revises the contents when they are not consistent.

The SYSD FPR editing unit 21 and the OPD FPR preparing unit 22 constitute the dividing unit 20 shown in FIG. 1.

Further, the FPR installation table changing unit 23, the system IPL unit 31, the FPR transfer unit 32, the FPR receiving unit 33, the FPR memory allocating unit 34, the SYSD FPR changing unit 35 and the FPR verifying unit 36 constitute the decision unit 30 shown in FIG. 1.

According to this structure, it is possible to transfer the functional processor necessary for each processor and to automatically select and combine the programs necessary to realize the function in each processor, so that it is possible to effectively utilize the memory which installs the program. Further, it is possible to shorten the IPL process on the processor and to reduce manual work during arrangement of the program by automatically arranging the program when changing partial charge of the processor. Still further, it is possible to improve efficiency of real time process by allocating the program on the real memory.

Figure 3:
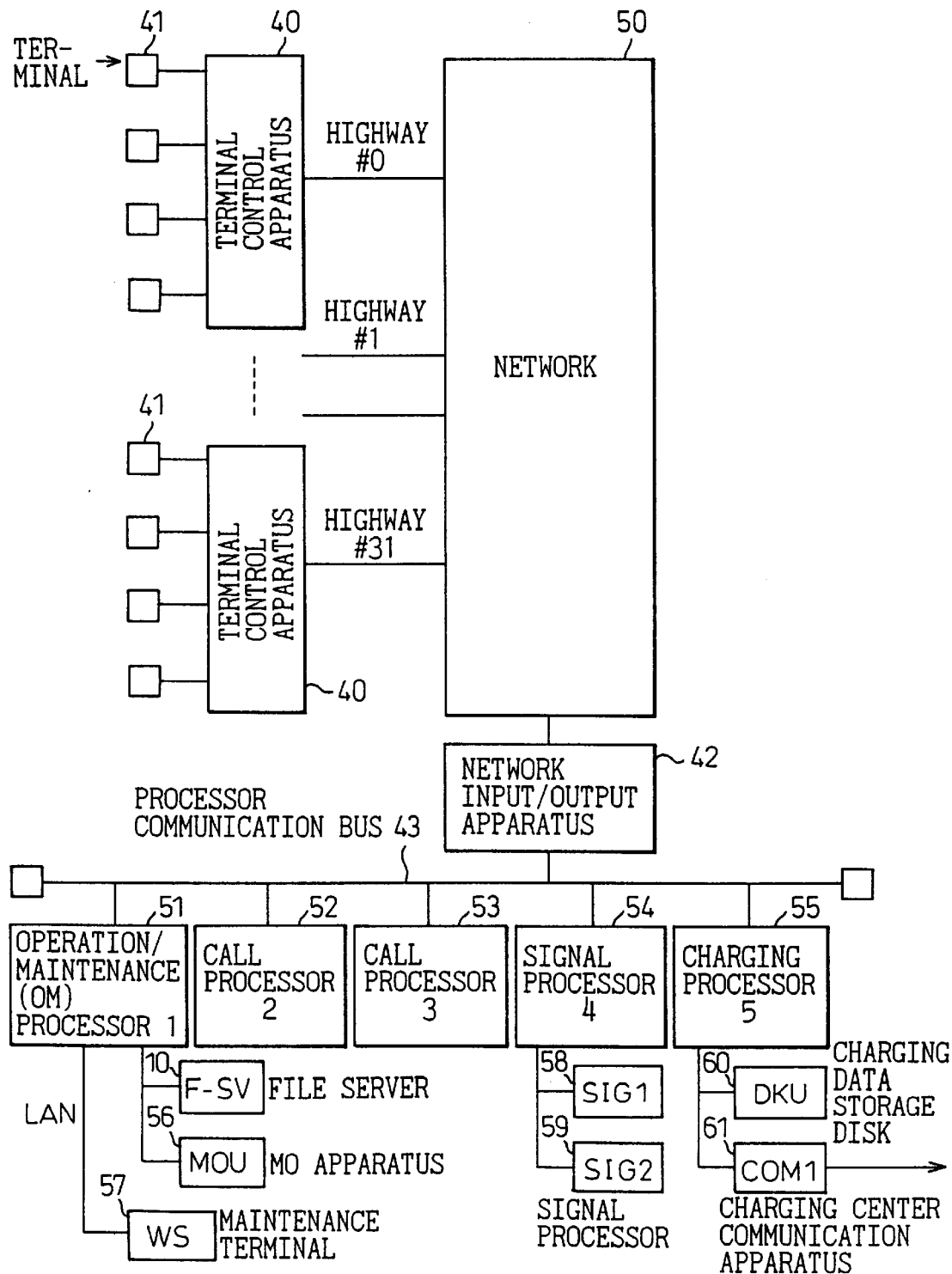
FIG. 3 is a structural block diagram of the whole system used for the present invention.

FIG. 3 is a structural block diagram of the whole system used for the present invention. In FIG. 3, reference number 40 denotes a terminal control apparatus connecting a plurality of terminals 41. The output of the terminal control apparatus 40 is connected to a network 50 through a highway. As shown in the drawing, thirty-two highways #0 to #31 are connected to the network 50. Reference number 42 denotes a network input/output apparatus connected to the network 50. Further, the network input/output apparatus 42 is connected to a processor communication bus 43.

Reference number 51 denotes an operation/maintenance processor 1 (below, an OM processor 1), 52 and 53 are call processors 2 and 3, 54 is a signal processor 4, and 55 is a charging processor 5. These processors 1 to 5 (51 to 55) are connected to the processor communication bus 43.

The OM processor 1 (51) installs the OPD FPR generating and changing unit 22, the FPR installation table changing unit 23, the system IPL unit 31 and the FPR transfer unit 32.

Further, all processors 1 to 5 (51 to 55) install the FPR receiving unit 33, the FPR memory allocating unit 34, the SYSD FPR changing unit 35 and FPR verifying unit 36.

In the OM processor 1, 57 is a work station (WS) connected to the OM processor 1 through a LAN and used as a maintenance terminal, 10 is the file server (F-SV) connected to the OM processor 1, and 56 is an magneto-optical disk (MO) apparatus (MOU) also connected to the OM processor 1.

In the signal processor 4 (54), 58 and 59 are signal processing apparatuses (SIG1 and SIG2) both connected to the signal processor 4.

In the charging processor 5 (55), 60 is a charging data storage disk (DKU) connected to the charging processor 5, and 61 is a charging center communication apparatus (COM1) connected to a charging center. In this system, the OM processor 1 controls the IPL for the information to each processor.

According to this embodiment, when there is change of the structure, the change is automatically determined by the system and can be reflected to all processors.

Next, the operation of each component in FIG. 2 is explained in detail below with reference to the attached drawings.

SYSD FPR Editing Unit 21

This unit 21 divides modules which constitute programs and data, gathers divided modules in accordance with each function, and edits these as the system data functional processor (SYSD FPR).

First, the module which constitutes programs and data is sorted in accordance with each function to be provided. That is, in the present invention, a gathering of modules which were sorted in accordance with each function is called "functional processor".

FIG. 4 shows a kind of functional processor of the system data. The kind of the functional processor is shown by GLP, OMP, CLP, SGP and AMP. The GLP (Global FPR) represents the system data related to functions installed in common to all processors, the OMP (Operation/Maintenance FPR) represents the system data related to operation/maintenance functions, the CLP (Call processing FPR) represents the system data related to call functions (switching service), the SGP (Signal processing FPR) represents the system data related to signal processing functions (example, SS7) between external systems, and the AMP (Automatic accounting FPR) represents the system data related to the charging processing functions.

FIG. 5 is a view for explaining contents of module registration Table. The module registration table is formed by a name of module, a name of functional processor corresponding to each module and a head virtual address corresponding to each functional processor.

FIG. 6 shows a file structure after processing in the SYSD FPR editing unit 21. The SYSD FPR editing unit 21 refers to the module registration table 11 and sorts each module to the functional processor in order to edit the file structure shown in FIG. 6. In FIG. 6, MO-BOOT is a BOOT for executing the IPL from the magneto-optical disk (MO apparatus), DK-BOOT is a BOOT for executing the IPL from the file server 10, SYS MOD is a SYSD structural module registration table, SYS FPRi is a system data functional processor corresponding to the functional processor i, OPD FPRi is an operation data functional processor corresponding to the functional processor i (vacant data), and OPR PROj is an operation data functional processor corresponding to a physical processor j (vacant data). As shown in FIG. 6, the file is arranged one-dimensionally.

In this case, the OPD FPR is not prepared in the SYSD FPR editing unit 21. However, when a backup of the file server is output to the MO apparatus, the file of the OPD FPR 13 is prepared.

Figure 7:
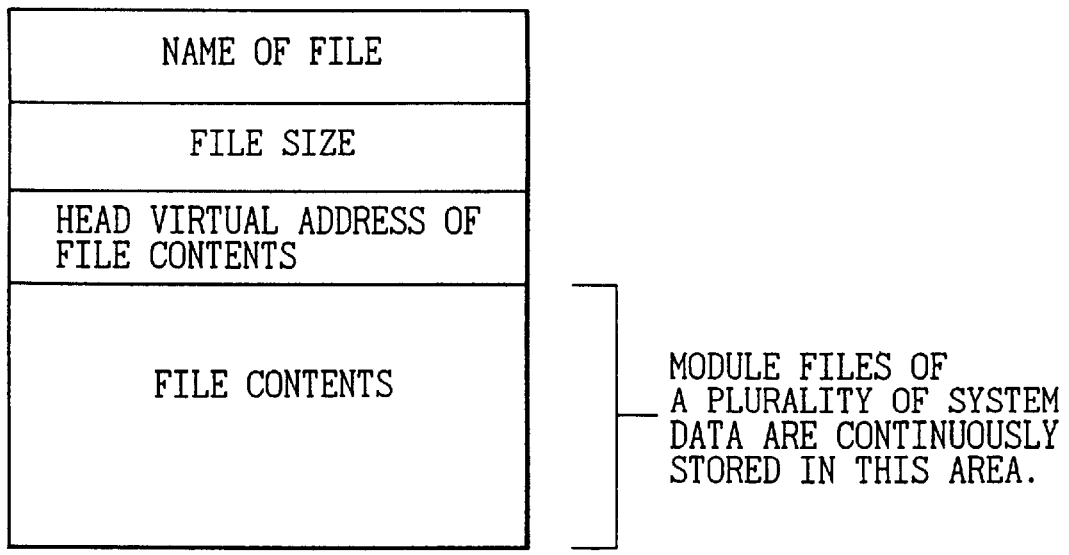
FIG. 7 shows an internal structure of a file of functional processor.
Figure 8:
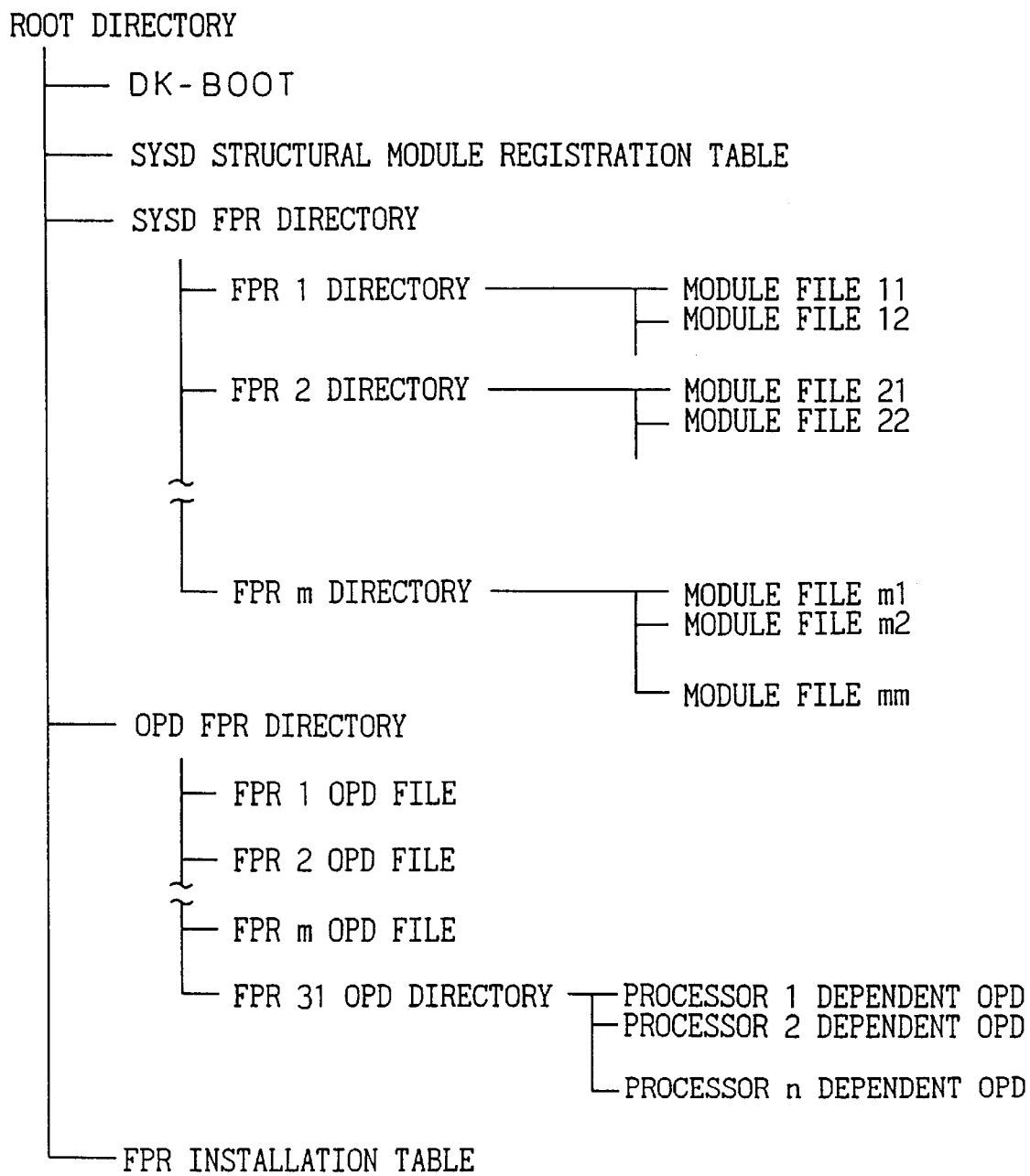
FIG. 8 shows a file structure of a file server.

FIG. 7 shows an internal structure of the file of the functional processor, and FIG. 8 shows a file structure of the file server. As shown in FIG. 7, each file is structured by name of file, file size, head virtual address of file contents, and file contents. Module files of system data are continuously stored in the file contents.

In FIG. 8, the root directory is structured by the DK-BOOT, the SYSD structural module registration table, the SYSD FPR directory, the OPD FPR directory, and the FPR installation table.

The SYSD FPR directory is structured by FPR 1 directory to FPR m directory, and each FPR directory includes a plurality of module files m1 to mm.

The OPD FPR directory is structured by FPR 1 OPD file to FPR m OPD file, and FPR 31 OPD directory. The FPR 31 OPD directory includes processor 1 dependent OPD to processor n dependent OPD.

OPD FPR Generating and Changing Unit 22

This unit 22 is activated by a command for defining and editing the operation data, sorts each operation data for every function, and prepares the functional processor. When generating and changing the operation data, the OPD FPR generating and changing unit 22 detects the functional processor in which the corresponding operation data is stored, and executes change of the corresponding operation data installed in each processor.

The setting of the operation data is executed by inputting an operation data defining and editing command to the system either upon the initial start-up of the system, or during the operation. In the process activated by the input of the operation data defining and editing command, the generating and changing processes of the operation data are executed by the OPD FPR generating and changing unit 22. All operation data used in the system are defined in the OPD attribute table as the system data.

The OPD FPR generating and changing unit 22 executes generation and change of the operation data by referring to the OPD attribute table. In the OPD attribute table, the following matters, i.e. the data structure of each operation data, a method for editing the operation data, the identification of the functional processor to which the operation data belongs, and a display as to whether it indicates the operation data for determining installation of the functional processor, are recorded in the OPD attribute table. The functional processor of the operation data has a concept equivalent to the functional processor of the system data and program, but the identification of each functional processor is slightly different.

FIG. 9 shows the kind of functional processor of the operation data. As in FIG. 4, the kind of the functional processor is shown by GLP, OMP, CLP, SGP, AMP and LCP. The GLP (Global FPR) represents the operation data related to functions installed in common to all processors, the OMP (Operation/Maintenance FPR) represents the operation data related to operation/maintenance functions, the CLP (Call processing FPR) represents the operation data related to call functions (switching service), the SGP (Signal processing FPR) represents the operation data related to signal processing functions (example, SS7) between external systems, the AMP (Automatic accounting FPR) represents the operation data related to the charging processing functions, and the LCP (Local functional processor) represents the operation data different in each processor.

According to this embodiment, it is possible to transfer the functional processor necessary for each processor. Further, by automatically selecting the program required for the function realized in each processor and by gathering the program, it is possible to effectively use the memory including the program and to reduce the IPL processing time of the processor.

Figure 11:
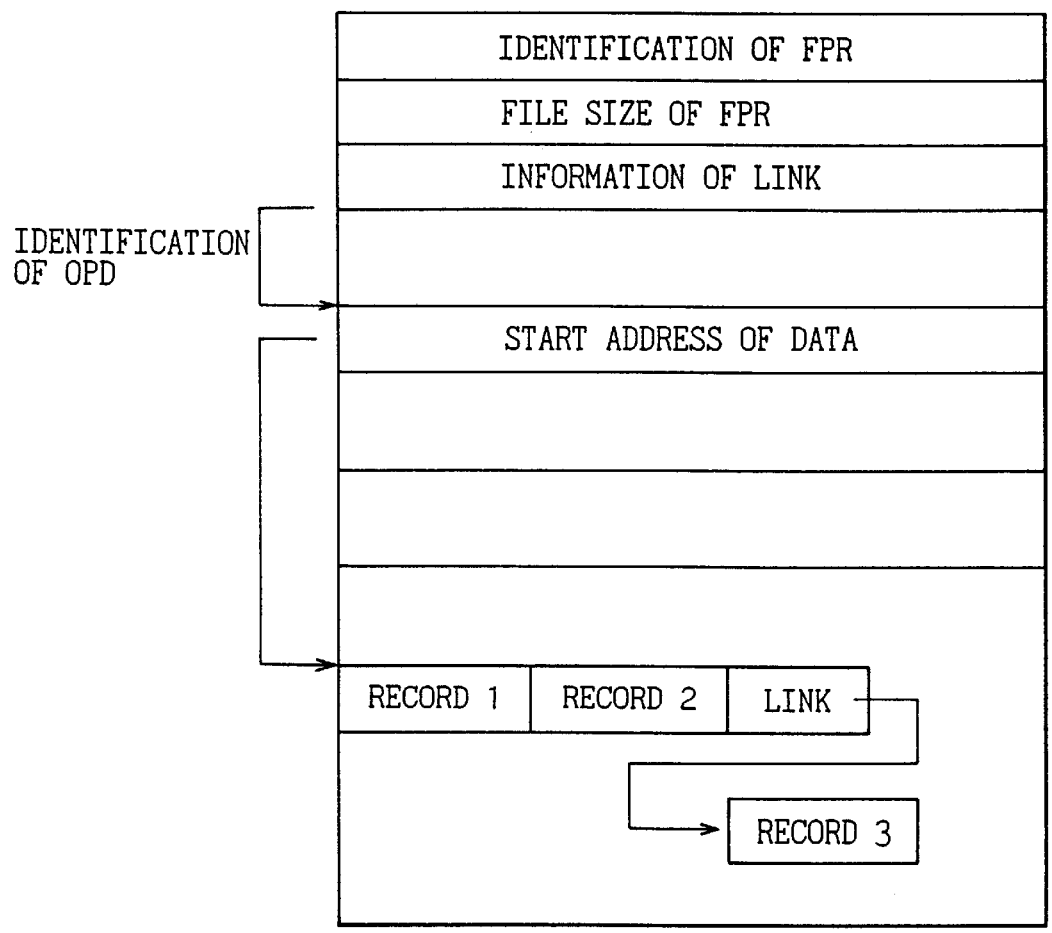
FIG. 11 shows an internal structure of an operation data functional processor.

FIG. 10 shows a structure of an OPD attribute table, and FIG. 11 shows an internal structure of an operation data functional processor. In the OPD attribute table, the data area is accessed by (operation data×4 (four words)). "F" is a code for indicating either necessity or unnecessity for starting of the FPR installation table changing unit 23. When the code F is "1", the unit 23 needs to start. When the code F is "0", the unit 23 does not need to start. The FPR ID number is provided to the next of the F.

Further, an OPD editing method is provided to the next of the FPR ID number. The OPD editing method represents a direct edition when it is "0", a hierarchical data when it is "1", a B-Tree formation when it is "2", and a formation with index when it is "3". In this case, the B-Tree formation is a balanced tree used in an edition of the database.

As shown in FIG. 11, the file contents are structured by an identification of the functional processor (identification of FPR), a file size of the FPR, an information of links, an start address of data accessed by the information of the link, and a plurality of records accessed by the start address. If necessary, the link is used for connecting between links.

Next, the process steps in the OPD FPR generating and changing unit 22 are explained in detail below.

1. First, an identification of the operation data (OPD), a method for editing (added, changed, erased) and the contents of data are input to the unit 22, and the unit 22 is started.

2. The OPD attribute table is indexed based on the identification of the OPD.

3. The functional processor for installing the OPD is identified based on the FPR information in the OPD attribute table.

4. Whether the OPD is prepared either when constructing the system or during the system operation, is determined. This is executed by an OPD preparing mode which is set by the system IPL unit 31.

5. When the OPD is prepared when constructing the system, the functional processor for installing the OPD is identified based on the OPD attribute table. Next, the edition of the OPD is executed for the corresponding FPR provided in the file server 10 (The operation data functional processor (OPD FPR) 0 has been structured in the system IPL unit).

6. When the OPD is prepared during the system operation, the processor which installs the corresponding FPR is identified based on the FPR installation table. Further, the editing process is activated for the processor which installs the corresponding FPR and OPD. After completion of edition of the OPD in all processors, the OPD of the file server is updated.

7. When there is a record which needs to start the FPR installation table changing unit 23 in the OPD attribute table, the FPR installation table changing unit 23 is started.

Figure 12:
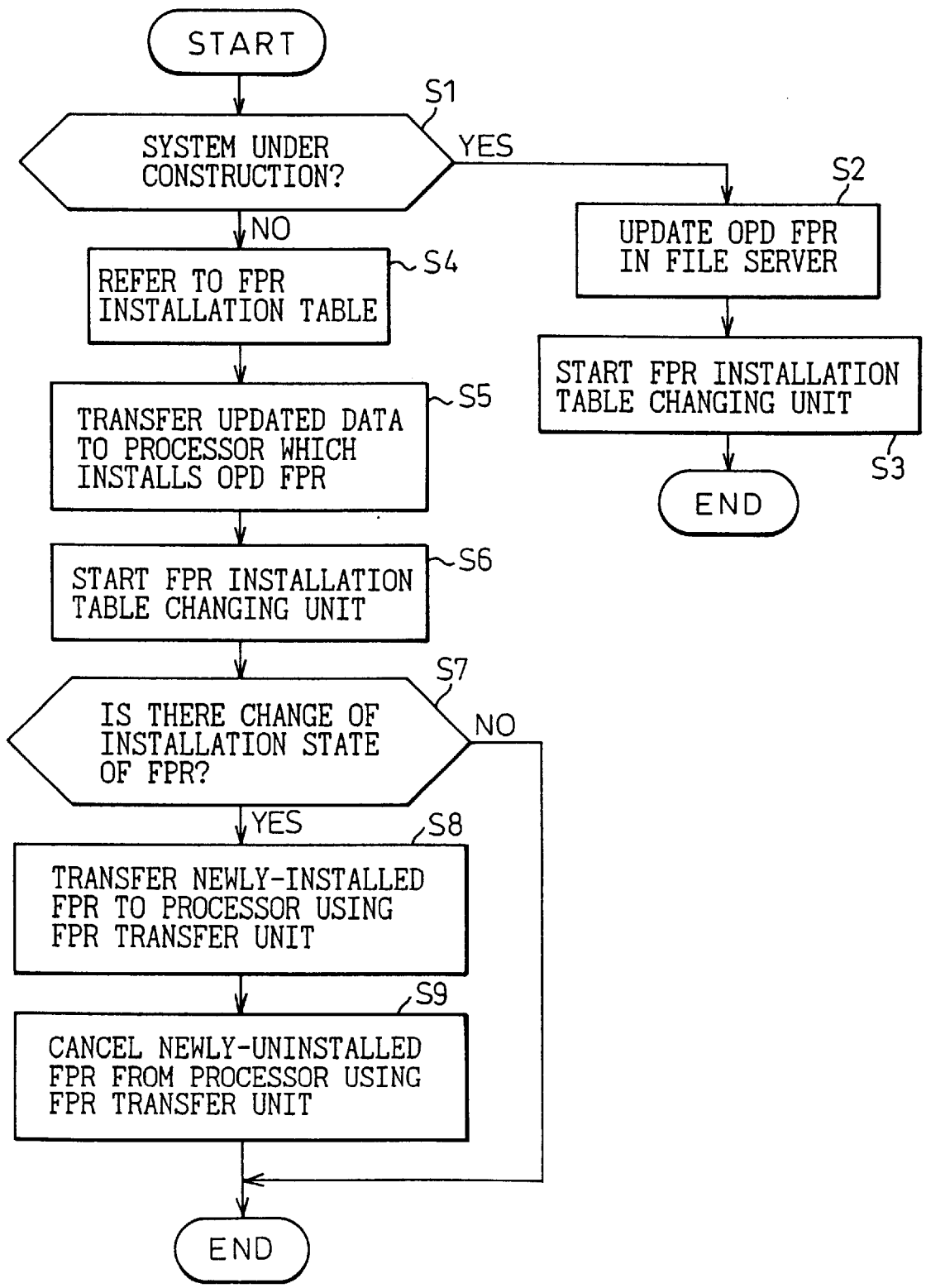
FIG. 12 is a flowchart for explaining OPD FPR (functional processor) generating and changing steps.

FIG. 12 is a flowchart for explaining the OPD FPR generating and changing steps. First, whether the system is under construction is checked (step S1). When it is under construction (YES), the operation data functional processor (OPD FPR) 13 in the file server 10 is updated (step S2), and the FPR installation table changing unit 23 is activated (step S3).

On the other hand, when the system is not "under construction" (NO), the FPR installation table is referred to (step S4). Next, the data to be updated is transferred to the processor which installs the corresponding OPD FPR 13 (step S5). Next, the FPR installation table changing unit 23 is activated (step S6).

Next, whether there is a change of installing state of the FPR is checked (step S7). When there is the change of installing state of the FPR, a newly-installed FPR is transferred to the corresponding processor using the FPR transfer unit 32 (step S8), and a newly-uninstalled FPR is cancelled from the corresponding processor using the FPR transfer unit 32 (step S9).

FPR Installation Table Changing Unit 23

This unit 23 is used for determining the functional processor to be installed to each processor from the input OPD, and records the FPR in the FPR installation table 14. This unit 23 is activated by the OPD FPR generating and changing unit 22, determines the FPR to be installed to each processor based on the contents of new OPD, and updates the FPR installation table 14. The data for determining installation of the FPR to each processor is the OPD which is installed in the OPD FPR 0.

Figure 14:
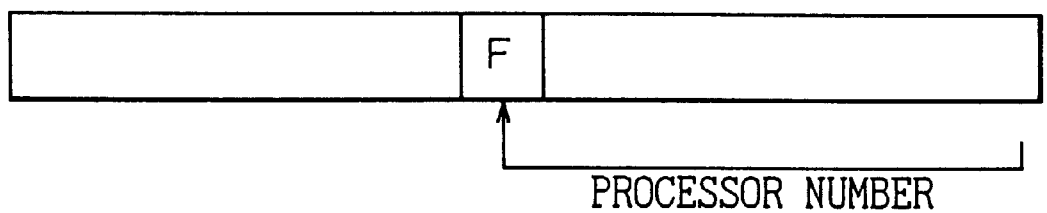

FIGS. 13 to 15 show operation data for determining installation/non-installation of the functional processor at the system structure of FIG. 3 and the functional processor of FIG. 9. FIG. 13 shows the operation data for determining installation of the functional processor.

When the functional processor (FPR) is the GLP, there is no operation data for determining installation/non-installation of the FPR (i.e., installed to all processors without condition). When the FPR is the OMP, it is determined that the FPR is installed when a work station (WS) is installed. When the FPR is the CLP, it is determined that the FPR is installed when a network input/output apparatus and highway information to be processed are installed. When the FPR is the SGP, it is determined that the FPR is installed when a signal processing apparatus (SIG) is installed. When the FPR is the AMP, it is determined that the FPR is installed when a disk apparatus (DKU) for storing charging data is installed. Further, when the FPR is the LCP, the FPR is installed when a processor is installed.

FIG. 14 shows one example of a processor installation table. When the flag F for accessing the processor number is "0", the processor is not installed. On the other hand, when the flag F is "1", the processor is installed.

FIG. 15 shows one example of the apparatus installation table. The area A which is accessed by the processor number "i" is a head address of the flag F. The area which is accessed by the table link is an identification number "j" of an apparatus. "k" is an apparatus number.

The identification number "j" is given as follows, i.e., 0=processor CPU; 1=processor memory; 2=processor communication bus interface; 3=file server; 4=MO; 5=WS; 6=network highway; 7=signal processing apparatus; 8=disk for charging; and 9=charging center interface.

In this case, the corresponding area is accessed by the ID number "j" of the apparatus, and the portion accessed by the apparatus number "k" from that point is the head of the flag F. When the flag F is "1", the apparatus is installed. When the flag F is "0", the apparatus is not installed.

Figure 16:
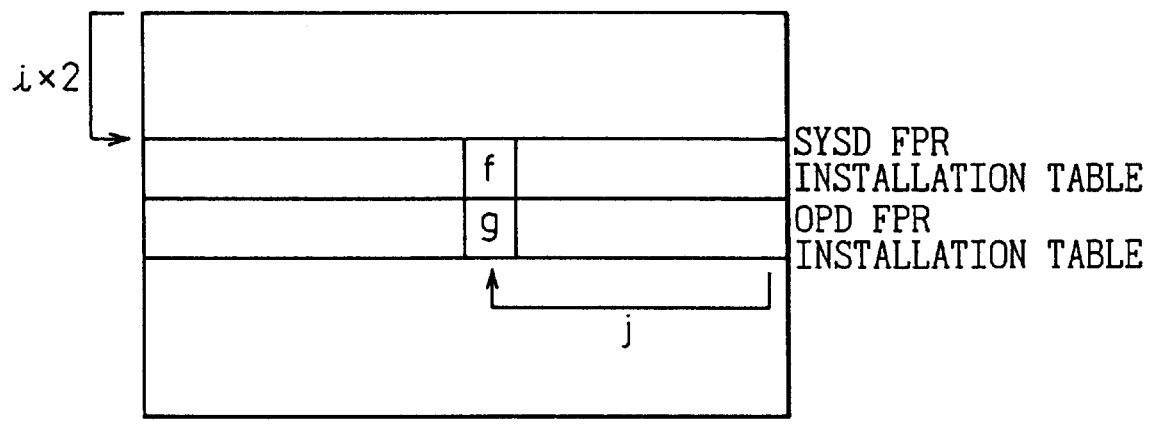
FIG. 16 shows one example of a FPR installation table.

FIG. 16 shows one example of the FPR installation table. "i" is the "processor number −1", the SYSD FPR installation table and the OPD FPR installation table are arranged in the area accessed by i×2 (two words). Where, "j" is the FPR identification (ID) number. When the flag "f", which is accessed by "j", is "1", the FPR is installed. When the flag "f" is "0", the FPR is not installed. Further, when the flag "g" is "1", the FPR is installed. When the flag "g" is "0", the FPR is not installed.

Next, the process steps in the FPR installation table and changing unit 23 are explained in detail below.

1. First, when constructing the system (the determination at construction of the system is the same as that of the OPD FPR generating and changing unit 22), the FPR installation table and changing unit 23 refers to the OPD for deciding installation of the FPR (see FIG. 13), and updates the FPR installation table 14. For the newly-added FPR, the file of the corresponding FPR is constructed with a constant size in the file server 10.

2. When operating the system, the FPR installation table and changing unit 23 refers to the OPD for deciding installation of the FPR (see FIG. 13), and updates the FPR installation table 14. Further, the newly-added FPR is transferred to the installed processor. The unnecessary FPR is erased from the corresponding processor using the FPR transfer unit 32.

When expanding the processor, the newly-added FPR is transferred after the BOOT is transferred to the expanded processor. When a certain OPD FPR is not used in any processor, that OPD FPR is erased from the file server 10. In this case, even if the SYSD FPR is not used in any processor, that SYSD FPR is not erased from the file server 10.

FPR Memory Allocating Unit 34

The program and data in each functional processor is prepared by using the virtual address. Further, each processor is arranged so as not to overlap on the virtual memory except for the OPD FPR 31 which is different from for each processor.

Figure 17:
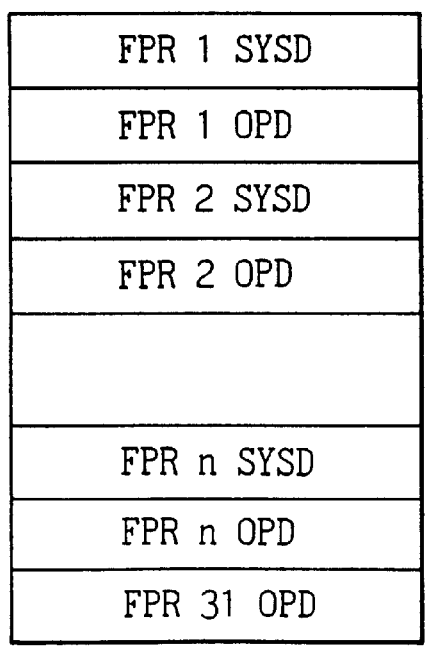
FIG. 17 shows one example of arrangement of each functional processor on the virtual memory.

FIG. 17 shows one example of arrangement of each functional processor on the virtual memory. As shown in FIG. 17, the system data (SYSD) and the operation data (OPD) are stored in each functional processor (FPR) (1 to n). The functional processor (FPR) 31 stores a plurality of processor dependent OPD for each processor 1 to n as shown in FIG. 8. The FPR memory allocating unit 34 is used as the unit for managing allocating state of each FPR to the real memory of each processor, and activated when executing the system IPL and when operating the system.

A. Execution of the System IPL

When executing the system IPL, the FPR transfer unit 32 and FPR receiving unit 33, both included in initial setting process (including the BOOT) of each processor, receives from the file server 10 of the operation/maintenance (OM) processor 51, and the functional processor received by these units 32 and 33 is allocated on the real memory.

The FPR memory allocating unit 34 refers to the FPR memory allocating table, and allocates the received FPR to the vacant area. Since the program and data in the FPR are linked by the virtual address, a conversion table (page table) for converting between the virtual address and the real address is prepared at the same time when allocating the program and data to the real memory.

FIG. 18 shows one example of allocation of FPR on the real memory, and FIG. 19 shows one example of the FPR memory allocating table. As shown in FIG. 18, the system data (SYSD) and the operation data (OPD) of each functional processor (FPR) are stored in each processor. In FIG. 18, processors are separated into processor 1, processors 2 and 3, and processor 4.

In FIG. 19, the area F indicating an allocating state of the FPR is accessed by the memory block number "i" (one mega byte (1 M byte)). In the area F, "a" is the FPR identification (8 bits), "b" is the identification of the SYSD of the OPD. When "b" is 1, it is the OPD. When "b" is 0, it is the SYSD. "c" is the installed/uninstalled state of the real memory. When "c" is 1, it is installed. When "c" is 0, it is not installed. Further, "1" is the next memory block number for loading the same FPR file (16 bits). It becomes the start block when "c" is 1 and when "1" is 0.

B. Operation of the System

When operating the system, the unit is activated through the OPD FPR generating and changing unit 22. The following explanations are given to steps of change of allocation of the FPR during operation of the system.

(1) Expansion of Apparatus

The following steps are in the case that, in the structure shown in FIG. 3, the signal processing apparatus (SIG) is installed in the call processor 3 (53).

1. First, a command for adding the signal processing apparatus (SIG) to the call processor 3 is input/.

2. The OPD FPR generating and changing unit 22 changes the OPD for installing newly-added signal processing apparatus. Since this OPD is contained in the OPD FPR "0", the updated contents are reflected to all installed processors using FPR transfer unit 32.

3. Since the start of the FPR installation table changing unit 23 is required in the changed OPD attribute table, the FPR installation table changing unit 23 is activated.

4. Since the functional processor 3 of the SYSD and OPD is not installed in the call processor 3, the FPR installation table changing unit 23 installs them in the call processor 3 using the FPR transfer unit 32.

5. The FPR receiving unit 33 of the call processor 3 receives the SYSD and OPD functional processor 3, and allocates the received FPR to the real memory using the FPR memory allocating unit 34.

6. An activating command for signal processing is input when adding the signal processing apparatus.

Figure 20A:
FIG. 20A shows one example of processor installation table.
Figure 20B:
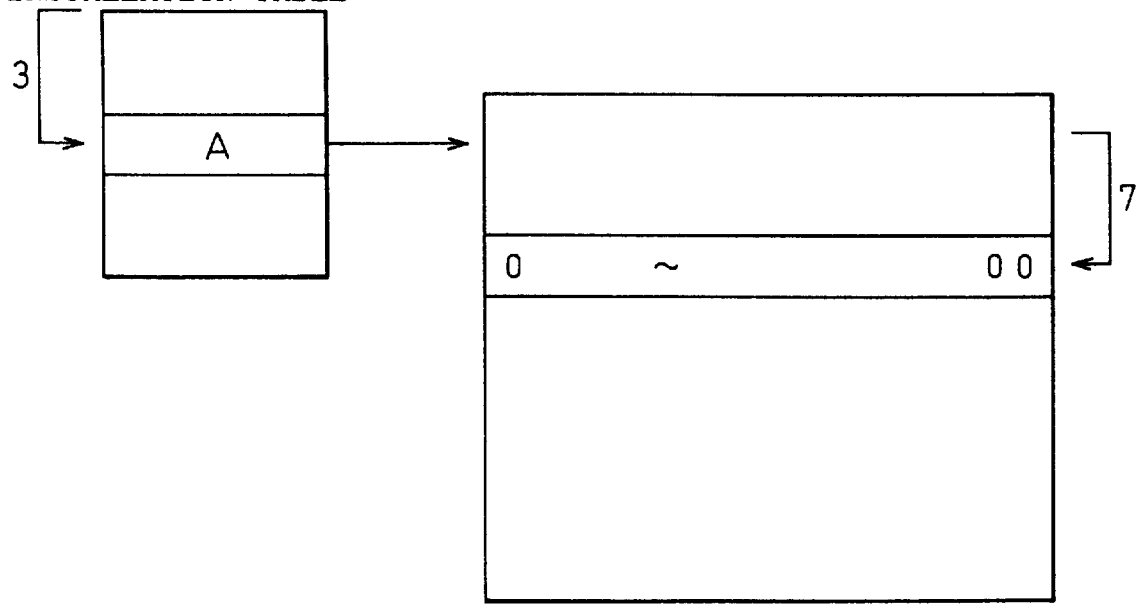
FIG. 20B shows one example of apparatus installation table.

FIG. 20A shows one example of a processor installation table, and FIG. 20B shows one example of an apparatus installation table. Further, FIG. 21A shows one example of a functional processor (FPR) installation table, and FIG. 21B shows one example of the allocating state of real memory. These FIGS. 20A to 21B show an example of information before an expansion of an apparatus.

In FIG. 20A, the processor installation table is accessed by the "processor number −1". In this case, since the processor number is started from "1", the "processor number −1" is used for indicating "0" bit when the processor number is "1". When the flag F is 0, the processor is not installed. When the flag F is 1, the processor is installed.

In FIG. 20B, the apparatus installation table is stored in the seventh area from the table accessed by A. In FIG. 21A, the FPR installing table is provided for each processor 1 to n. In FIG. 21B, the system data (SYSD) and the operation data (OPD) are stored in each functional processor (FPR). The operation data is stored in the functional processor 31.

Figures 22A, 22B:
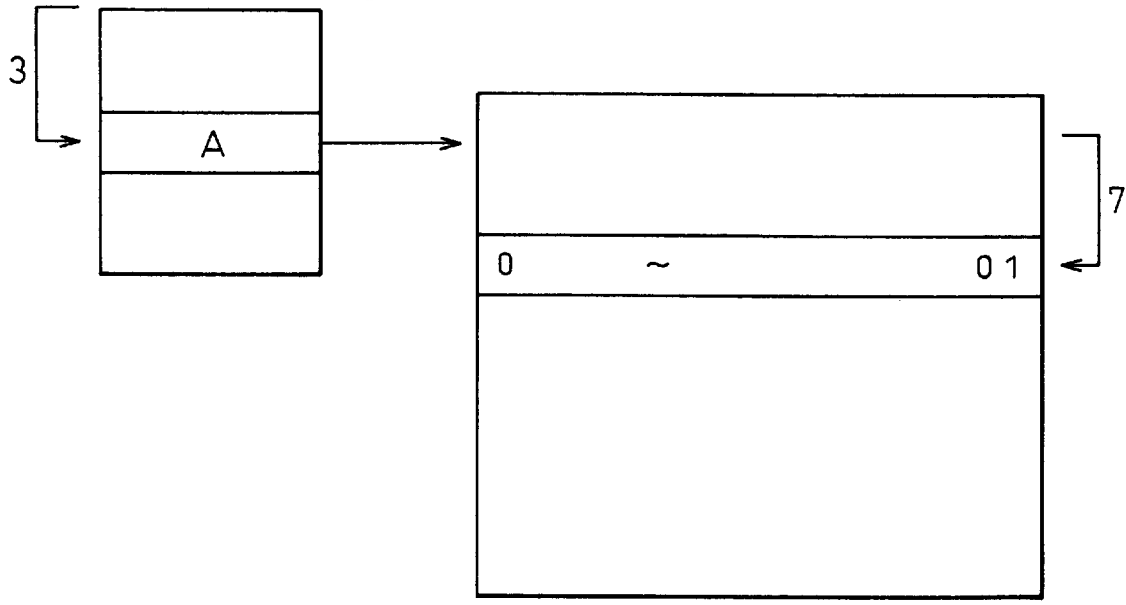
FIG. 22A shows one example of processor installation table.
FIG. 22B shows one example of apparatus installation table.

FIG. 22A shows one example of a processor installation table, and FIG. 22B shows one example of an apparatus installation table. Further, FIG. 23A shows one example of a functional processor (FPR) installation table, and FIG. 23B shows one example of an allocating state of real memory. These FIGS. 22A to 23B show an example of information after an expansion of an apparatus.

In FIG. 22A, the processor installation table is accessed by the "processor number −1". When the flag F is 0, the processor is not installed. When the flag F is 1, the processor is installed.

In FIG. 22B, the apparatus installation table is stored in the seventh area from the table accessed by A. In FIG. 23A, the FPR installation table is provided for each processor 1 to n. In FIG. 23B, the system data (SYSD) and the operation data (OPD) are stored in each functional processor (FPR). The operation data is stored in the functional processor 31.

(2) Expansion of Processor

The following steps are in the case that the processor is newly expanded during operation of the system.

1. First, a definition command of the processor to be expanded is input. The input data is the processor number and the processor name. The display of installation of the processor is set to the processor installation table (operation data) based on the definition command. Further, the CPU, the memory and the communication bus interface between processors are also installed. At that time, the state of the expanded processor is set to "under expansion of processor".

2. Since the above operation data is contained in the operation data (OPD) function data (FPR) "0", the change of contents is reflected to all processors containing the OPD FPR "0".

3. Since the start of the FPR installation table changing unit 23 is required for the OPD attribute table of the processor installation table, FPR installation table changing unit 23 is activated.

4. The FPR installation table changing unit 23 updates the FPR installation table, and recognizes necessity for the SYSD of the expanded processor, the OPD FPR "0" and the OPD FPR 31 of the expanded processor. Further, the OPD FPR 31 is newly prepared with fixed size in the file server 10. After that, the BOOT is transferred to the expanded processor, and the above processor is transferred to the expanded processor using the FPR transfer unit 32.

5. After the SYSD and the OPD FPR are transferred to the expanded processor, the initial setting of the expanded processor is activated. In this step, the expanded processor executes the initial setting of the SYSD, the OPD FPR "0", and the OPD FPR 31.

6. An OPD definition command added to the extended processor is input. In this case, if there is a change in the installation of the FPR, the necessary FPR is generated in the file server, and transferred to the expanded processor.

7. After all OPD definition command are input, the initial setting of the expanded processor is activated. After the above activation, the expanded processor executes the initial setting after completion of loading of the necessary FPR to all memories.

FIG. 24 is a flowchart for executing an expansion of a processor. In the operation/maintenance (OM) processor side; the OPD definition command of the processor to be expanded is input (step S1). Based on the OPD definition command, the OPD of the processor installation is updated (set to "under construction"). Further, the CPU of the expanded processor, the memory and the communication bus interface between processors are installed. Further, the function installation table is updated, and the functional processors 1 and 31 of the expanded processor is added. Further, the OPD FPR 31 is formed in the file server 10.

Next, after completion of initial setting of the OM processor, the OM processor starts to transfer the IPL process (BOOT process) to the processor to be installed based on the processor installation table (step S2). The expanded processor starts the BOOT process (step S7). Next, the OM processor refers to the FPR installation table, and transfers the functional processors 1 and 31 to the expanded processor (step S3). The expanded processor receives the functional processor and allocates the FPR in the memory (step S8).

Next, the OM processor transmits the start-up instruction to the expanded processor, and releases the "under construction" state after completion of the start-up (step S4). The expanded processor starts to set the initial setting, and the expanded processor is activated (step S9). Next, the OM processor adds the OPD definition of the expanded processor (step S5), and updates the FPR installation table. Further, when there is the newly-added functional processor, the OM processor transfers the newly-added FPR to the file server 10 (step S5).

The expanded processor receives the functional processor, and allocates it to the memory (step S10). Next, the OM processor executes restart instruction of the expanded processor after completion of input of all operation data (step S6). The expanded processor executes start-up after arrangement of necessary functional processor (step S11).

(3) Decrease of Processor (Remove of Communication Control Apparatus)

In the state of FIGS. 22A, 22B, 23A and 23B, the following explanations are given in the case that the signal processing apparatus SIG installed in the processor 3 is changed to an uninstalled state.

1. The signal processing apparatus SIG of the processor 3 is cut from the system so that the function of the signal process is stopped.

2. A command for setting the signal processing apparatus SIG to the uninstalled state is input.

3. The OPD for installing the signal processing apparatus which is removed is changed by the OPD FPR generating and changing unit 22. The above OPD is contained in the OPD FPR "0", the updated contents are reflected to all installed processors by using the FPR changing unit.

4. Since the start of the FPR installation table changing unit 23 is required for the OPD attribute table, the FPR installation table changing unit 23 is activated.

5. The FPR installation table changing unit 23 recognizes that the SYSD from the processor 3 and the OPD FPR 3 are not installed based on the removal of the signal processing apparatus SIG. Since the corresponding FPR is installed in the processor 3, the corresponding FPR is removed from the processor 3 by using the FPR transfer unit 32.

6. The FPR receiving unit 33 of the processor 3 removes the FPR which is designated by the FPR memory allocating unit 34 from the real memory.

System IPL Unit (Intial Setting Unit) 31

The system IPL unit 31 determines the functional processor installed in each processor, and executes the IPL process of the FPR to the memory of each processor by using the FPR transfer unit 32, the FPR receiving unit 33 and the FPR memory allocating unit 34 in order to execute start-up of the system.

The following steps are given to the IPL process of the system.

1. The MO (magneto-optical disk) is installed to the MOU (MO apparatus) 56 of the OM processor 1 (51) (see FIG. 3), the IPL of the OM processor 1 is activated by the MO so that a MO-BOOT program stored in the MO is started.

2. The MO-BOOT program executes the format of the file server 10, and sequentially stores the file of the functional processor stored in the MO.

3. The MO-BOOT takes the SYSD FPR "0" from the 35 file server 10 and moves it to the real memory of the OM processor by using the FPR transfer unit 32, the FPR receiving unit 33 and the FPR memory allocating unit 34 which are stored within the MO-BOOT. Then, the initial setting of the SYSD FR "0" is activated. At that time, a preparing mode of the operation data is set to "under construction" state.

4. After the OM processor 51 is started by only SYSD FPR "0", an OPD definition command is input from the maintenance terminal (WS) 57. In this case, before input of the OPD definition command, the file of the OPD FPR "0" is constructed, with a fixed size, on the file server 10.

5. The OPD FPR is prepared on the file server 10 by using the OPD FPR generating and changing unit 22.

6. After input of all OPD definition command, the IPL is activated from the file server 10.

7. Next, the DK-BOOT stored in the file server 10 is activated. The DK-BOOT refers to the FPR installation table 14, and moves the FPR installed in the OM processor 51 to the memory by using the FPR transfer unit 32, the FPR receiving unit 33 and the FPR allocating unit 34 which are stored within the BOOT. Then the initial setting of the OM processor 51 is activated. At that time, the preparing mode of the operation data is set to "under construction" state.

8. After completion of start-up of the OM processor 51, a P-BOOT program is transferred to another processor A so that the P-BOOT program is activated.

9. The OM processor 51 identifies the functional processor which needs to transfer to another processor A based on the FPR installation table 14, and transfers it to the processor A by using the FPR transfer unit 32.

10. The P-BOOT receives the functional processor by using the FPR receiving unit 33 and the FPR memory allocating unit 34, and allocates it on the memory.

11. After completion of transfer of all processors, the initial setting of the processor A is activated, and the processor A is activated.

FIG. 25 shows basic steps of the system IPL process. As shown in the flowchart, first, the OM processor 51 starts the IPL from the MO (step S1). Next, after initialization of the file server 10 by using the MO-BOOT, the MO file is stored in the file server 10 (step S2). Next, the FPR "0" is taken from the file server 10 to the memory., the initial setting is started (step S3).

Next, the OPD definition command is input (step S4). In this case, the OPD FPR is constructed in the file server 10, and the FPR installation table 14 is constructed in the file server 10.

Next, the IPL is activated from the file server 10 (step S5). Next, the functional processor necessary for the OM processor 51 is loaded on the memory using the DK-BOOT (step S6). Next, the initial setting of the OM processor 51 is executed (step S7). Next, after completion of initial setting of OM processor, the IPL process is started in the installed processor based on the FPR installation table 14 (BOOT transfer, step S8). In another processor, the BOOT process is activated (step S11).

Next, the OM processor 51 refers to the FPR installation table 14, and transfers the functional processor to each processor (step S9). Another processor receives the functional processor, and allocates it to the memory (step S12).

Next, the OM processor transmits start-up instruction to each processor (step S10). Another processor starts the initial setting, and executes start-up of the processor (step S13).

According to this embodiment, it is possible to prepare the file provided to the system on a client by only using the OM processor.

FPR Transfer Unit 32

The FPR transfer unit 32 reads the file of the designated FPR from the file server 10, and transfers it to the FPR receiving unit 33 of the designated processor. There are three modes, i.e., new addition of the FPR, change of contents of the FPR and erasure of the FPR, in the transfer mode of the file of the functional processor. Process steps of each mode are explained in detail below.

(A) Addition of the FPR

1. After input of the following matters, i.e., identification as to whether the FPR to be transferred is either the SYSD or the OPD, identification of the FPR, designation of addition, and processor number of designation processor, the FPR transfer unit 32 is activated.

2. The FPR transfer unit 32 informs the start of transfer to the FPR receiving unit 33. The contents to be informed are identification of either the SYSD or the OPD, identification of the FPR, designation of addition and file size of the FPR to be transferred.

3. The FPR receiving unit 33 ensures the real memory area for allocating the functional processor using the FPR memory allocating unit 34 based on the contents. Further, result of the above process is informed to the FPR transfer unit 32.

4. The FPR transfer unit 32 transfers the designated FPR by the fixed size of data to the FPR receiving unit 33. The contents to be informed are identification of either the SYSD or the OPD, identification of the FPR, designation of addition, relative address of start of the FPR (relative address on the FPR), transfer size and additional data.

5. The FPR receiving unit 33 sequentially stores the received data in the memory area which is ensured from the designated relative address.

6. After completion of transfer of all data, the FPR transfer unit 32 informs completion of transfer to the FPR receiving unit 33.

(B) Change of Contents of the Function

1. After input of the following matters, i.e., identification as to whether the FPR to be transferred is either the SYSD or the OPD, identification of the FPR, designation of change, and processor number of designation processor, the FPR transfer unit 32 is activated.

2. The FPR transfer unit 32 informs start of transfer to the FPR receiving unit 33. The contents to be informed are identification of either the SYSD or the OPD, identification of the FPR, designation of change, and the size of the whole portion to be changed.

3. The FPR receiving unit 33 confirms correctness of the contents, and returns a response.

4. The FPR transfer unit 32 transfers the portion to be changed of the designated FPR by the fixed size of data to the FPR receiving unit 33. The contents to be informed are identification of either the SYSD or the OPD, identification of the FPR, designation of change, relative address of start of the FPR (relative address on the FPR), transfer size and additional data.

5. The FPR receiving unit 33 sequentially writes the received data in the memory area from the designated relative address.

6. After completion of transfer of all data, the FPR transfer unit 32 informs completion of transfer to the FPR receiving unit 33.

(C) Erasure of the Functional Processor

1. After input of the following matters, i.e., identification as to whether the FPR to be transferred is either the SYSD or the OPD, identification of the FPR, designation of erasure, and processor number of designation processor, the FPR transfer unit 32 is activated.

2. The FPR transfer unit 32 informs start of transfer to the FPR receiving unit 33. The contents to be informed are identification of either the SYSD or the OPD, identification of the FPR, and designation of erasure.

3. The FPR receiving unit 33 releases the area in which the FPR is allocated by the FPR memory allocating unit 34 based on the contents, and result of the above process is informed.

4. The FPR transfer unit 32 informs completion of erasion to the FPR receiving unit 33.

FIG. 26 is a view for explaining interface between the FPR transfer unit 32 and the FPR receiving unit 33 shown in FIG. 2. Each interface is set as follows.

1. Start of Transfer of the FPR

The identification of either the SYSD or the OPD, the number of the FPR, the identification of addition/change/erasion and total size of transfer data are transferred from the FPR transfer unit 32 to the FPR receiving unit 33.

2. Response for Start of Transfer of the FPR

The result of allocation/release of the memory is transferred from the FPR receiving unit 33 to the FPR transfer unit 32.

3. Transfer of the FPR

The identification of either the SYSD or the OPD, the number of the FPR, the size of transfer data, relative address of start of transfer data, and contents of transfer data are transferred from the FPR transfer unit 32 to the FPR receiving unit 33.

4. Response of Transfer of the FPR

The results of reception and opening of memory write are transferred from the FPR receiving unit 33 to the FPR transfer unit 32.

5. Completion of Transfer of the FPR

The identification of either the SYSD or the OPD, the number of the FPR, and the identification of addition/change/erasion are transferred from the FPR transfer unit 32 to the FPR receiving unit 33.

6. Response of Completion of Transfer of the FPR

The response of completion of transfer of the FPR is transferred from the FPR receiving unit 33 to the FPR transfer unit 32.

FPR Receiving Unit 33

The FPR receiving unit 33 receives the FPR transferred from the FPR transfer unit 32, allocates it in the real memory using the FPR memory allocating unit 34.

Further, when erasing the FPR from the processor, the FPR designated by the FPR transfer unit 32 is erased from the real memory. The process steps are the same as the FPR transfer unit 32.

SYSD FPR Changing Unit 35

When the SYSD FPR changing unit 35 receives the change for the SYSD FPR, the unit 35 detects the functional processor containing the portion to be changed, and changes the corresponding portion of the FPR which is installed in each processor. The process steps of the unit 35 are explained in detail with reference to FIG. 27 below. FIG. 27 shows one example of a patch file.

1. The patch file for changing the system data is read from the maintenance operation terminal (WS) 57. As shown in FIG. 27, the patch file is formed by a name of patch file, a module file ID to be patched, a virtual address to be patched, number of words to be patched, contents of patch, an old contents of patched area, cause of problem to be solved by the patch, and explanation of contents of confirming steps to be solved.

2. The module registration table 11 (see FIG. 2) is indexed based on the module name described in the patch file.

3. Based on the information of the corresponding module of the module registration table 11, the SYSD FPR changing unit 35 detects the SYSD FPR to which the corresponding module belongs.

4. The SYSD FPR changing unit 35 detects the processor in which the FPR obtained by the above step 3 is installed using the FPR installation table 14.

5. The patch data is transferred to all processors which install the corresponding processor using the FPR transfer unit 32.

According to the embodiment, it is possible to revise the functional processor by automatically executing patching process to each processor.

FPR Verifying Unit 36

The FPR verifying unit 36 verifies periodically the contents of the file server 10 so as not to occur differences in the contents between the same SYSD FPRS installed in each processor, and revises inconsistent portions.

The FPR verifying unit 36 is periodically activated on each processor. Further, the FPR verifying unit 36 executes verification and revision of the FPR installed in the memory of the processor based on the following steps.

1. The FPR verifying unit 36 detects the FPR installed in the memory of the processor based on the FPR memory allocating unit 34.

2. The following steps are executed for the installed FPR.

3. The contents of the file of the FPR allocated to the memory of the processor is read from the head of the file with a fixed size.

4. The contents of the corresponding portion of the file of the FPR provided from the above item 3 are read for the file server 10 contained in the OM processor.

5. The contents read from the above steps 3 and 4 are-compared each other. If there is an inconsistency, its contents are output to the WS 57 using a message, and inconsistent portions are revised based on the contents from the file server 10. When the patch process or change of the OPD are input for the inconsistent portion, the message is not output.

According to the embodiment, when there is occurrence of inconsistency, it is possible to revise the contents of the corresponding processor by using the contents of the file server 10.

According to the present invention, it is possible to apply the present invention to not only the IPL method of the processor in one system, but also an IPL of processors distributively arranged in the network and an arrangement management of the program.

What is claimed is:

1. An IPL system applied to a multiprocessor system including a plurality of processors, comprising;
    a file server for storing system data consisting of programs and data;
    a dividing unit operatively connected to the file server for dividing the system data into functional units, and for preparing functional processors each structured by gathering the functional units; and
    a decision unit operatively connected to the file server for determining the functional processors to be transferred to each of the plurality of processors, in accordance with contents of operation data which are different from each other in each of the plurality of processors.

2. An IPL system applied to a multiprocessor system as claimed in claim 1, wherein the functional processors comprises system data functional processors and operation data functional processors.

3. An IPL system applied to a multiprocessor system as claimed in claim 2, wherein the system data functional processors comprise five kinds of functional processors, i.e., system data related to functions installed in common to all processors, system data related to operation/maintenance functions, system data related to call functions, system data related to signal processing functions between external systems, and system data related to charging processing functions.

4. An IPL system applied to a multiprocessor system as claimed in claim 2, wherein the operation data functional processors comprises six kinds of functional processors, i.e., operation data related to functions installed in common to all processors, operation data related to operation/maintenance functions, operation data related to call functions, operation data related to signal processing functions between external systems, operation data related to charging processing functions, and operation data different in each processor.

5. An IPL system applied to a multiprocessor system as claimed in claim 2, wherein, after the system data functional processors and the operation data functional processors are constructed in the file server, an IPL process of each of the processors is activated.

6. An IPL system applied to a multiprocessor system as claimed in claim 4, wherein when the operation data is changed during operation of the system; change of installation of the functional processor is automatically determined to each processor based on the contents of change; the functional processor to be newly installed is automatically transferred to the corresponding processor; and memory allocation in the corresponding processor is released for the processor to be newly uninstalled.

7. An IPL system applied to a multiprocessor system as claimed in claim 4, wherein when the operation data is changed during operation of the system; the processor for installing functional processors including changed operation data is detected; and the same changed contents are reflected onto the corresponding functional processor of each processor.

8. An IPL system applied to a multiprocessor system as claimed in claim 2, wherein, when a patch is input to the functional processor; installation of the functional processor to each processor is determined; and the patch is automatically executed to all corresponding functional processors of each processor.

9. An IPL system applied to a multiprocessor system as claimed in claim 1, wherein whether the contents of the same functional processor installed in each processor are different is periodically verified; and when there is an inconsistency, the inconsistency is revised based on the contents of the file server.

10. An IPL system applied to a multiprocessor system as claimed in claim 1, wherein the file server comprises a module registration table consisting of module names, functional processor names each corresponding to the module name, and head virtual addresses each corresponding to the functional processor name; a system data functional processor including a plurality of functional processors each corresponding to system data; an operation data functional processor including a plurality of functional processors each corresponding to operation data; and a functional processor installation table including processor numbers, kinds of processors, data of installed/uninstalled state of each functional processor.

11. An IPL system applied to a multiprocessor system as claimed in claim 1, wherein the dividing unit comprises means for editing system data functional processors, and means for generating and changing operation data functional processors.

12. An IPL system applied to a multiprocessor system as claimed in claim 1, wherein the decision unit comprises means for changing a functional processor installation table; means for executing an IPL process for each processor and performing start-up of the system; means for transferring functional processors to designated processor; means for receiving functional processors; means for allocating functional processors to memory; means for changing functional processors based on change of system data; and means for verifying functional processors with the contents of file server.

* * * * *